United States Patent [19]
Noel et al.

[11] Patent Number: 5,966,735
[45] Date of Patent: Oct. 12, 1999

[54] ARRAY INDEX CHAINING FOR TREE STRUCTURE SAVE AND RESTORE IN A PROCESS SWAPPING SYSTEM

[75] Inventors: Karen Lee Noel, Pembroke; Michael Seward Harvey; Thomas Robert Benson, both of Hollis, all of N.H.

[73] Assignee: Digital Equipment Corporation, Maynard, Mass.

[21] Appl. No.: 08/754,868

[22] Filed: Nov. 22, 1996

[51] Int. Cl.[6] .................................................. G06F 12/10
[52] U.S. Cl. ........................................................ 711/206
[58] Field of Search .................................. 711/203, 206, 711/207, 208

[56] References Cited

U.S. PATENT DOCUMENTS 5,101,485  3/1992  Perazzoli, Jr. ........................... 711/206

*Primary Examiner*—Eddie P. Chan
*Assistant Examiner*—Kevin L. Ellis
*Attorney, Agent, or Firm*—Hamilton, Brook, Smith & Reynolds, P.C.

[57] ABSTRACT

A new system and method for outswapping a process is disclosed. The new system forms one or more working set list chains (also referred to as "page table chains") during the outswap process. The new system then conveniently locates and outswaps a number of page table pages of the process to be outswapped by traversing the working set list chains. In a preferred embodiment, the forming of each working set list chain is performed while traversing a working set list during outswapping of a number of body pages of a process. Each working set list entry potentially describes a page of virtual memory in use by the process to be outswapped. In a further aspect of the disclosed system, traversing the working set list of the process to be outswapped includes determining whether each one of the working set list entries indicates a private page table page. If an entry in the working set list indicates a private page table page, the present system adds a link to a working set list chain. In the disclosed system, a working set list entry is determined to indicate a private page table page if the page of virtual memory described by the working set list entry is within a page table structure associated with said process. The page table structure is hierarchical, and a separate working set chain is formed for one or more individual levels of the page table hierarchy.

16 Claims, 20 Drawing Sheets

ARRAY INDEX CHAINING FOR TREE STRUCTURE SAVE AND RESTORE IN A PROCESS SWAPPING SYSTEM

FIELD OF THE INVENTION

The disclosed system relates generally to virtual memory management within a computer operating system, and more specifically to an efficient method of swapping a process in and out of memory. The disclosed system further relates generally to efficient storage of a sparsely populated tree data structure to secondary storage.

BACKGROUND

In existing virtual memory systems, the virtual and physical memory in use by a process is defined by a working set list, and mapped by a tree-structured page table. When the address space of a process is "swapped out" to free up physical memory, the page table page itself must be swapped out as well. Tear down and recreation of page tables as a result of swapping in existing systems can be an expensive operation involving multiple traversals of the working set list. This is the case because the hierarchical organization of the page table is not reflected in the working set list.

Further in existing systems, a swapper process executes as shared system code within an operating system. The swapper process removes other processes from main memory. When the swapper process removes a process from main memory, it prepares the memory used by the process, including the memory used by the process to store the page table for that process, to be written to secondary storage, for example a magnetic disc.

In one example existing system, the swapper process builds a "swap map" representing the physical memory used by the process to be out-swapped so that the physical memory may be used by another process. The working set list is the structure which drives execution of the swapper process in existing systems. The swap file is a file in secondary storage that contains all out-swapped processes. Each outswapped process consumes one swap slot within the swap file. The act of writing contents of the physical memory used by a process to be outswapped and related information into a swap map is referred to as a process "out-swap". An input/output subsystem subsequently copies the code and data from the physical memory indicated by the swap map to secondary storage. At that point the physical memory of the outswapped process may be used by another process.

As the size of virtual addresses grow, and the amount of physical memory used by a typical process increases, the expense of using traditional systems to outswap a process having a hierarchical page table structure becomes prohibitive. Costs associated with traversing the working set list in order to tear down the page table of a process to be outswapped, and then to rebuild the page table upon in-swap are especially exorbitant.

Accordingly for the reasons stated above there is required a new system for swapping a process in and out of memory. The new system should conveniently and efficiently store and restore a hierarchical page table data structure to and from secondary storage. The new system should further eliminate multiple traversals of a working set list during outswap or in-swap of a process.

SUMMARY OF THE INVENTION

A new system and method for outswapping a process is disclosed. The new system forms one or more working set list chains (also referred to as "page table chains") during the outswap process. The new system then conveniently locates and outswaps a number of page table pages of the process to be outswapped by traversing the working set list chains. In a preferred embodiment, the forming of each working set list chain is performed while outswapping a number of body pages of a process. The outswapping of the body pages of a process includes traversing a working set list of the process, where the working set list includes one or more working set list entries. Each working set list entry describes a page of virtual memory in use by the process to be outswapped.

In a further aspect of the present system, traversing the working set list of the process to be outswapped includes determining whether each one of the working set list entries indicates a private page table page. If an entry in the working set list indicates a private page table page, the present system adds a link to the working set list chain. In the disclosed system, a working set list entry is determined to indicate a private page table page if the page of virtual memory described by the working set list entry is within a page table structure associated with said process. Further in the disclosed system, adding a link to a working set list chain includes writing an index of the working set list entry into a field within a physical page database entry associated with a page of physical memory mapped to a previous private page table page in the working set list. The page table structure is hierarchical, and a separate working set chain is formed for one or more individual levels of the page table hierarchy.

In this way there is provided a new system for swapping a process in and out of memory. The disclosed system conveniently and efficiently stores and restores a hierarchical page table data structure to and from secondary storage. The new system further eliminates multiple traversals of a working set list during outswap or inswap of a process.

BRIEF DESCRIPTION OF THE DRAWINGS

The foregoing features and other aspects of the invention will now become apparent when the accompanying description is read in conjunction with the following drawings in which.

DETAILED DESCRIPTION OF THE PREFERRED EMBODIMENTS

Figure 1:
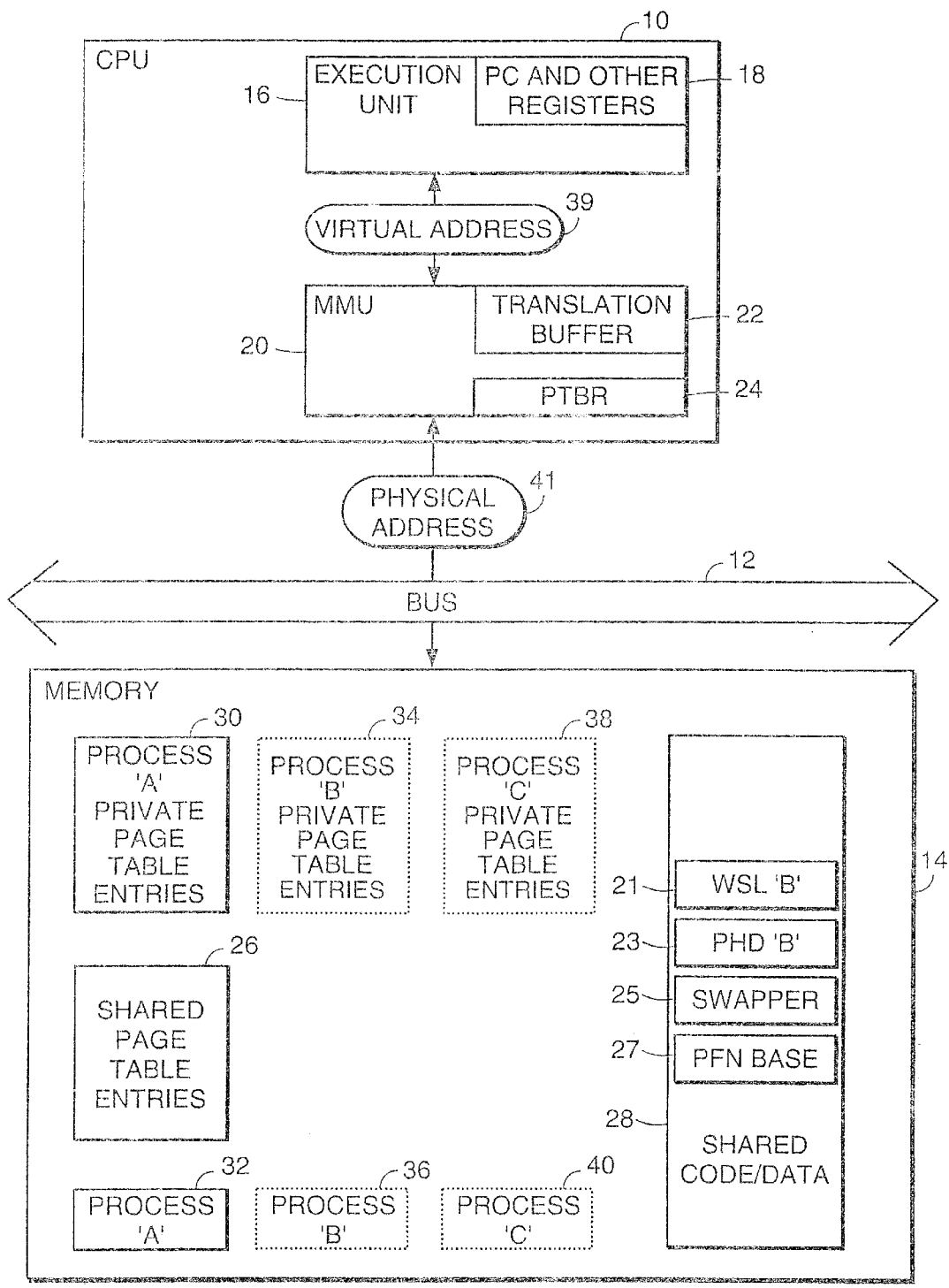
FIG. 1 is a block diagram showing an example embodiment of a virtual memory system.

Now with reference to FIG. 1, an example embodiment of a virtual memory system is described. FIG. 1 shows a computer system including an example memory management system and virtual memory system. A central processing unit (CPU) 10 is shown coupled with a bus 12, which in turn is coupled with a memory 14. The CPU 10 is shown including an execution unit 16 having a program counter (PC) and other registers 18, coupled with a memory management unit 20. The memory management unit 20 is shown including a translation buffer 22 as well as a page table base register (PTBR) 24. The execution unit 16 is coupled with the memory management unit 20.

In the example embodiment of FIG. 1, a process is the basic entity scheduled and executed on the CPU 10. Useful programs may be run by a user within a given process. Each process consists of an address space and process context information. The process context information defines the state of execution of a given process, with respect to certain predefined register and variable values, for example including the values of the PC and other registers 18 and the PTBR 24.

When a process is to be executed, the process context for that process is first made current, for example by writing the values of the PC and other registers 18 and the PTBR 24. The specific process being executed is referred to as the current process. When the current process is changed, this is referred to as a context switch. The current process context defines the mapping of the virtual address space to physical memory by indicating the page table entries to be used for virtual address translation by the memory management unit 20. This indication to the memory management unit is made by loading an address indicating process private page table entries of a current process into the PTBR 24, for example w hen a context switch is made.

A process is said to be "resident" if the code and data necessary for that process to be executed are located in memory. When a resident process is outswapped, it becomes "non-resident". The memory 14 in FIG. 1 is shown including process private code and data for several resident processes, as well as shared code and data. The memory 14 is further shown including page table entries mapping the virtual addresses of the process private code and data, as well as the shared code and data, to physical memory.

Specifically in FIG. 1, the memory 14 is shown including process private page table entries 30, mapping the process private code and data within the process 'A' 32, as well as shared page table entries 26 mapping the shared code and data 28. In the example of FIG. 1, process 'A' 32 is currently executing, and the code and data within process 'A' 32, as well as the shared code and data 28 are mapped by the current address space as defined by the current process context. Shared code and data 28 for example includes operating system services, routines, functions and data addressable and potentially available to any currently executing process.

Further in the shared code and data 28 there is shown a working set list 21 and a process header 23 for process 'B' 36. Also, the shared code and data 28 are shown including a swapper process 25 and a physical page ("PFN") data base 27. Non-current processes 'B' 36 and 'C' 40 are also shown within the memory 14. Further in memory 14 are shown process B private page table entries 34 and process C private page table entries 38, for mapping process private code and data within the processes B 36 and C 40 respectively.

Swapper Process

During operation of the elements shown in FIG. 1, the swapper process 25 efficiently outswaps and inswaps a target process's page table pages, by saving a working set list index (WSLX) and a backing storage address (BAK) for each page table page of the target process. The disclosed swapper process 25 does this in such a way that the resulting system is efficient both in terms of performance and in terms of the amount of physical memory used to store the information.

During operation, the swapper process 25 forms one or more working set list chains, including for example a page table chain for each level of a hierarchical page table structure. During outswap of a process to be outswapped, referred to herein as a "target" process, and for example shown in FIG. 1 as process 'B' 36, the disclosed swapper chaining system uses a field within a physical page database entry associated with the physical memory page of each page table page to store the WSLX of the next page table chain "entry" (also referred to as a page table chain "link").

The WSLX values for the first entries in the chains are stored in the process header 23. In the example embodiment of the swapper process, the process header is always written to the start of the swap slot in the swap file, hence it can always be located upon inswap.

The initial setup of the working set list chains is performed by the swapper process 25 during a single, linear traversal of the working set list by the swapper process 25 during outswap of the process body pages.

Further during an outswap procedure, the swapper process 25 subsequently stores the working set list chain entries into the page table entries that map page table pages at a higher level in the page table hierarchy. The lowest level page table chain (for example level 3) is traversed first because the mapping of each lower level of the page table hierarchy is destroyed during the traversal of the next higher level page table chain (for example level 2), since the traversal of the page table chain overwrites the page table entries when chain links are moved from the physical page database entries to the page table entries.

During page table inswap, the swapper process 25 accesses the page table entries that map the lower level page table pages to find the working set list indexes of the lower level page table pages and restore the BAK field contents in each PFN database entry.

The chaining of the WSLX values allows the swapper process on inswap to determine the WSLX for each page table page as well as locate the next page table page without traversing the process's working set list. The page table chain contained in the highest level of the page table structure (for example the level 2 page table chain contained in the level 1 page table entries) is traversed first during inswap. This is necessary because the mapping of the next lower level of the page table structure (for example the level 3 page table chain contained in the level 2 page table entries) is not available until the next highest level page table pages are reestablished.

While three levels of page tables are described in the example embodiments disclosed herein, it is foreseen that a fourth level, or further levels of page tables may be implemented using the herein disclosed invention. The present system can be easily extended, as will be evident to persons skilled in the art, to include further page table chains to accommodate any further page table levels. Thus the present system can easily be generalized to any number of page table levels within a hierarchical page table structure.

Further during operation of the elements shown in FIG. 1, CPU 10 uses physical addresses 41 to read the contents of memory locations within the memory 14. For example, when process 'A' 32 is executing, the PC holds the virtual address of an instruction to be executed. As the CPU executes instructions from process A 32 pointed to by the PC, the memory management unit 20 translates virtual addresses 39 within those instructions into physical addresses 41. The memory management unit 20 uses the contents of the page table base register 24 to access the process 'A' private page table entries 30 and the shared page table entries 26 in order to obtain the physical addresses 41 of code or data in process A 32 itself or of the shared code and data 28.

Figure 2:
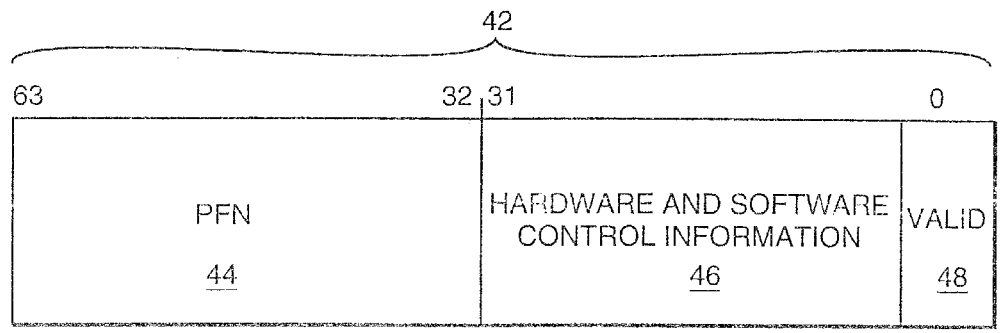
FIG. 2 is a block diagram showing the format of an example embodiment of a page table entry.

Now with regard to FIG. 2 an example embodiment of a page table entry is described. The process private page table entries 30, 34, and 38 as shown in FIG. 1 for example consist of one or more page table entries having the format as shown in FIG. 2. Similarly the shared page table entries 26 as shown in FIG. 1 are also for example of the format shown in FIG. 2.

The example page table entry shown in FIG. 2 includes a page frame number (PFN) 44, hardware and software control information 46, and a valid bit 48. The PFN 44 includes some pre-determined number of bits of the physical address of the page of physical memory mapped by that page table entry 42. The predetermined number of bits of the physical address are for example sufficient to indicate a page of physical memory. The PFN 44 is thus a physical address specifying a page of physical memory. In this way each page table entry maps a page of virtual addresses to a physical page of memory. The hardware and software control information 46 includes such information as protection codes defining a level of access required for a process to reference the page of physical memory mapped by the page table entry 42. The valid bit 48 indicates the validity of, among other things, the page frame number 44. For example, if the valid bit is 1, then the page frame number 44 provides a valid mapping of a virtual page to a physical page that may be used by the memory management unit 20 as shown in FIG. 1.

Figure 3:
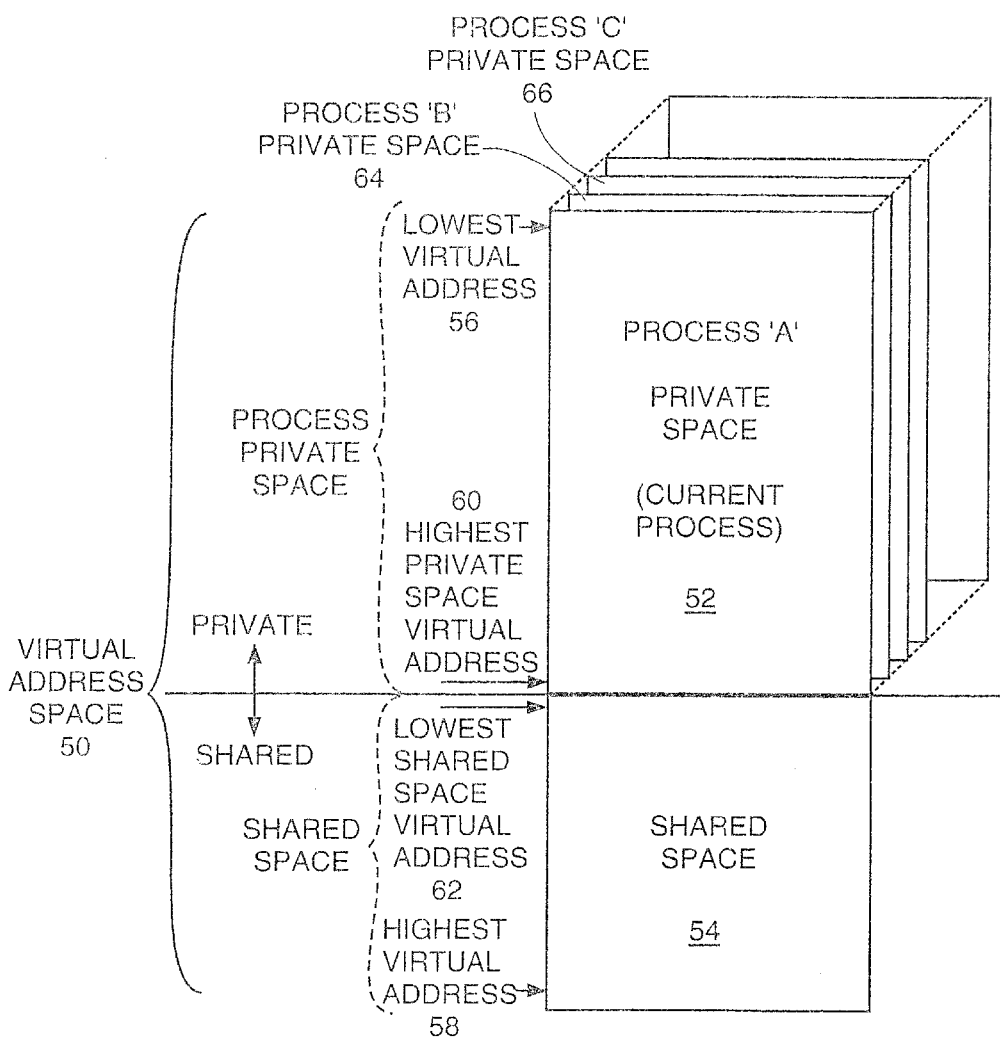
FIG. 3 is a block diagram showing an example embodiment of a virtual address space divided into process private and shared space.

Now with regard to FIG. 3 an example embodiment of a virtual address space divided into process private and shared space is described. In FIG. 3 there is shown a virtual address space 50 divided into a process private space 52, for example mapping code and data within process A 32 of FIG. 1, and further including a shared space 54 for example mapping the shared code and data 28 in FIG. 1. The virtual address space 50 is shown extending from a lowest virtual address 56 to a highest virtual address 58. The process private space is shown extending from the lowest virtual address 56 up to a highest private space virtual address 60. The shared space 54 is shown extending between a lowest shared space virtual address 62 and the highest virtual address 58.

Further shown in FIG. 3 is the process B private space 64 and process C private space 66. Since process B and process C are not the current process (process A is the current process) the process private virtual addresses in the process private space 52 do not currently map code and data from within process B or process C. This results because the process private portion of a non-current process's virtual address space is not resident in the currently active virtual address space. Accordingly any virtual address translated by the memory management unit 20 as shown in FIG. 1, that lies between the lowest virtual address 56 and the highest process private space virtual address 60, will be translated by the process A private page table entries 30. Upon assertion of a virtual address between the lowest shared space virtual address 62 and the highest virtual address 58, the memory management unit 20 maps that virtual address to a physical address of shared code and data 28.

Continuing with regard to the elements shown in FIG. 3, when a context switch occurs, and for example process B 36 becomes the current process, then a new process context is loaded into the CPU 10. The new process context includes loading an address into the PTBR 24 indicating one or more of the process B private page table entries 34. Accordingly, after the context switch, process private virtual addresses between the lowest virtual address 56 and the highest process private virtual address 60 are mapped to the code and data for process B. However, after the context is switched so that process B is the current process, virtual addresses between the lowest shared space of virtual address 62 and the highest virtual address 58 continue to be mapped to the shared code and data 28. Thus it is shown that shared code and data continues to be mapped by the virtual address space independent of the currently executing process.

Figure 4:
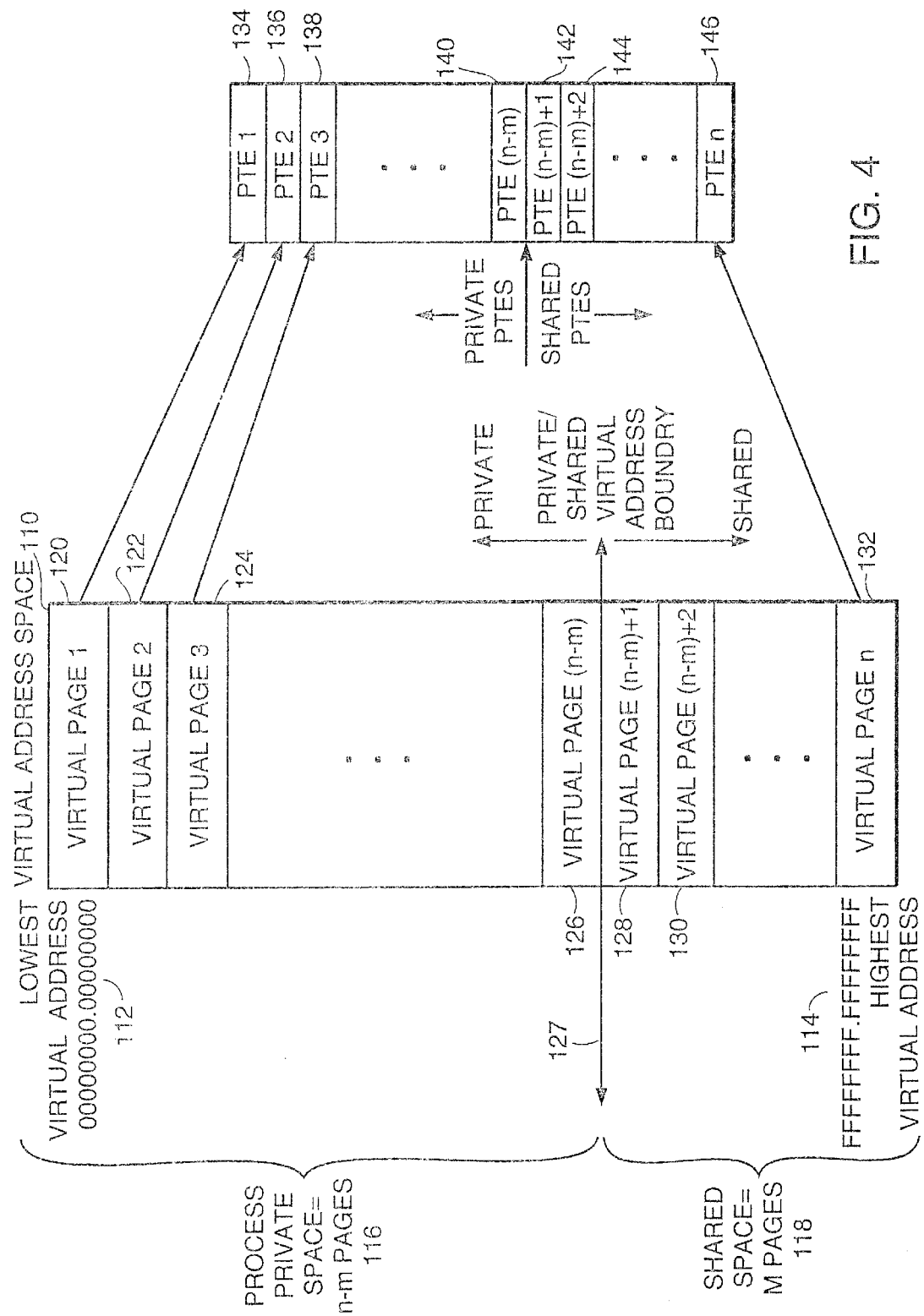
FIG. 4 is a block diagram showing an example embodiment of a virtual memory system having an uneven split allocation of process private space and shared space.

Now with regard to FIG. 4 is described an example embodiment of a virtual memory system providing an uneven split allocation of process private space and shared space. For purposes of example the virtual address space 110 is shown mapping 'n' pages of virtual addresses. A shared space 118 in FIG. 4 is shown including 'm' virtual pages. A process private space 116 in FIG. 4 is shown including 'n' −'m' virtual pages.

Accordingly the virtual address space 110 in FIG. 4 is shown including virtual pages 1 through 'n', for example virtual page 1 120, virtual page 2 122, virtual page 3 124, virtual page (n−m) 126, virtual page (n−m) +1 128, virtual page (n−m) +2 130, up through virtual page n 132. The virtual address space 110 in FIG. 4 is shown to extend from a lowest virtual address 112 to a highest virtual address 114. In expressing 64-bit addresses in hexadecimal format, a '.' is inserted between the eight most significant digits and the eight least significant digits as a convention to ease readability. For purposes of example the lowest virtual address 112 is shown as a 64-bit address equal to 00000000.00000000 (hexadecimal). The highest virtual address 114 is shown as a 64-bit address equal to FFFFFFFF.FFFFFFFF (hexadecimal). The boundary between the process private space 116 and the shared space 118 in FIG. 4 is shown by private/shared virtual address boundary 127.

During operation of the elements shown in FIG. 4, virtual addresses within virtual page 1 120 are translated using the contents of PTE 1 134, virtual addresses within virtual page 2 122 are translated using the contents of PTE 2 136, virtual addresses within virtual page 3 124 are translated using the contents of PTE 3 138, and virtual addresses within virtual page n−m 126 are translated using the contents of PTE n−m 140. In this way all process private space virtual addresses are mapped by page table entries 1 through n−m, where n is the total number of virtual pages and m is the number of pages in the shared space 118. Similarly, virtual addresses between (and including) the beginning of virtual page (n−m) +1 128 up to those within virtual page n 132 are mapped by the page table entries (n−m) +1 142 through page table entry n 146. Accordingly, the page table entries 1 through n−m are considered process private page table entries, while the page table entries (n−m) +1 through n are considered shared page table entries.

Figure 5:
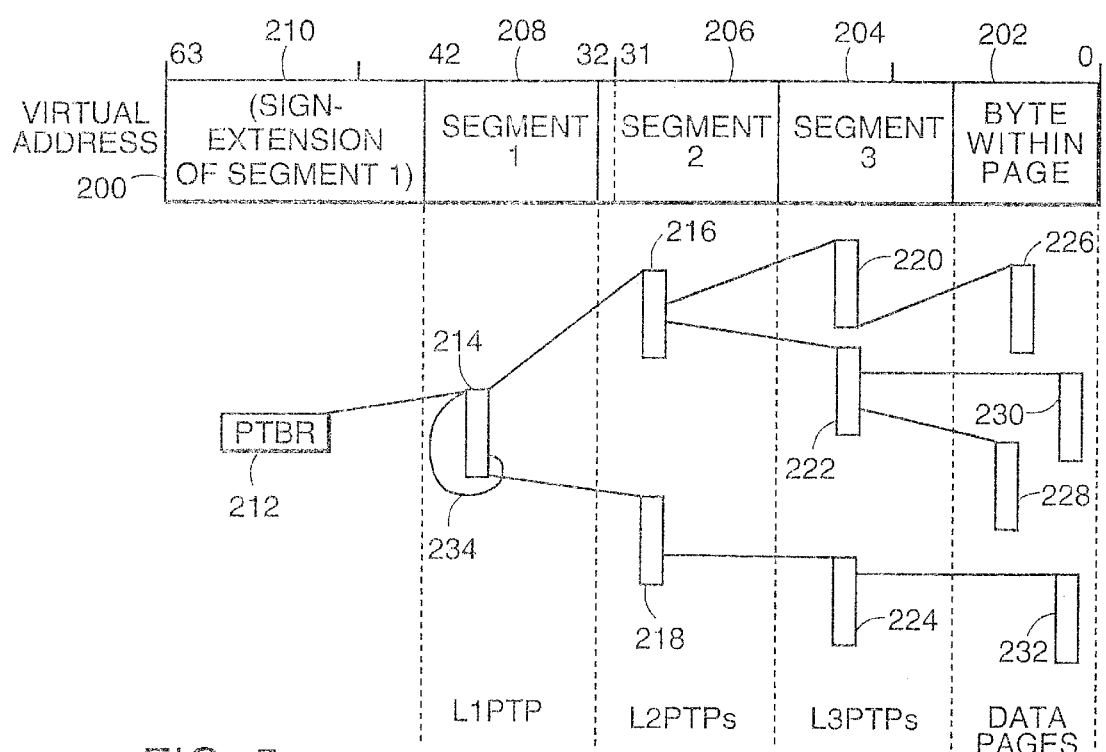
FIG. 5 is a block diagram showing an example embodiment of a page table structure and virtual address format.

Now with reference to FIG. 5, there is described an example embodiment of a page table structure and virtual address. FIG. 5 shows a virtual address 200 including a byte within page field 202, a segment 3 field 204, a segment 2 field 206, a segment 1 field 208, and a "sign extension" of segment 1 210. The bits in the sign extension of segment 1 210 all contain the value of the most significant bit (for example bit 42 ) of segment 1 208. FIG. 5 further shows a page table base register 212 (PTBR also shown in FIG. 1 as PTBR 24 ), a level 1 page table page 214, two level 2 page table pages 216 and 218, three level 3 page table pages 220, 222, and 224, and four data pages 226, 228, 230, and 232. The number of level 2 page table pages, level 3 page table pages and data pages in FIG. 5 is given for purposes of example. Other level 2 page table pages, level 3 page table pages and data pages in the present system are omitted from FIG. 5 for purposes of clarity. Further in FIG. 5 there is shown a self-mapper 234 located within the level 1 page table page 214 and pointing also to the level 1 page table page 214.

In the example embodiment of FIG. 5, the PTBR 212 contains a pointer (for example a PFN) to a highest level of the current process's page table structure. At that highest level of a given process's page table structure, there is shown for example a single page of page table entries referred to as the level 1 page table page as shown by element 214 in FIG. 5. The level 1 page table page 214 includes a number of level 1 page table entries. Each level 1 page table entry maps a page table page at the next lower level in the page table structure, for example one of the level 2 page table pages as shown by elements 216 and 218 in FIG. 5. Similarly each of the level 2 page table pages, 216 and 218, includes a number of level 2 page table entries. Each level 2 page table entry maps a page table page at the next lower level in the translation hierarchy, for example one of the level 3 page table pages shown as elements 220, 222, and 224 in FIG. 5. Further, each of the level 3 page table pages includes a number of level 3 page table entries. Each of the level 3 page table entries indicates a data page, for example one of data pages shown as elements 226, 228, 230 and 232. The data pages indicated by the level 3 page table entries are the pages of physical memory which ultimately contain the code or data mapped to the virtual address 200.

During operation of the elements shown in FIG. 5, the memory management unit 20 translates the virtual address 200 into a physical address based on the contents of the fields within the virtual address 200. The segment one field 208 is an index into the level 1 page table page, selecting a particular level 1 page table entry, which indicates a specific level 2 page table page for the next stage of translation. The segment two field 206 then is used to index into the selected level 2 page table page in order to select a level 2 page table entry, which indicates a specific level 3 page table page for the next stage of translation. The segment three field 204 is then used to index into that level 3 page table page to select a level 3 page table entry, which in turn indicates a specific page of physical memory containing code or data. Next the byte within page field 202 of the virtual address 200 is used to select a specific byte address within the indicated physical memory page. The page table entry within the level 3 page table page is thus the page table entry ultimately mapping the virtual address to a page of physical memory.

For example consider the below virtual address in which the bit fields yield the following values:
virtual address=00000000.00800004
Segment one bit field=0
Segment two bit field=1
Segment three bit field=0
Byte within page=4

Further during operation of the elements shown in FIG. 5, the self-mapper 234 is used to map the page table structure itself into the virtual address space. The self-mapper 234 is a predetermined one of the page table entries within the level 1 page table page 214, configured to point to the beginning of the level 1 page table page 214. When a virtual address is translated that includes a segment 1 value indexing the self-mapper 234, the translation logic or code accesses the level 1 page table page 214 for a second iteration in the translation, as if the level 1 page table page 214 were a next lower level page table page, for example one of the level 2 page table pages. This configuration of the self-mapper 234 creates a portion of the total virtual address space, referred to as "page table space", that is exactly large enough to contain all page table entries necessary to map the total virtual address space. This configuration of the self-mapper also causes the page table entries that map the process private portion of the virtual address space to be process private, and the page table entries that map the shared portion of the virtual address space to be shared. Accordingly, the process private page table entries within page table space are context switched between processes along with the process private space they map when operating system swaps context from one process to another.

In other example embodiments, the page size and/or number of levels in the page table hierarchy may for example be increased or decreased, thus mapping greater or lesser amounts of virtual space. For example a full 64-bit virtual address may be used to provide a larger virtual address space. In the example implementation of FIG. 5, an 8KB page size and three levels of page table allow the example system to map 8TB of virtual memory for a single process. To map the entire 8TB address space available to a single process, the example embodiment uses 8GB of PTEs, each PTE having for example a length equal to 8 bytes.

Figure 6:
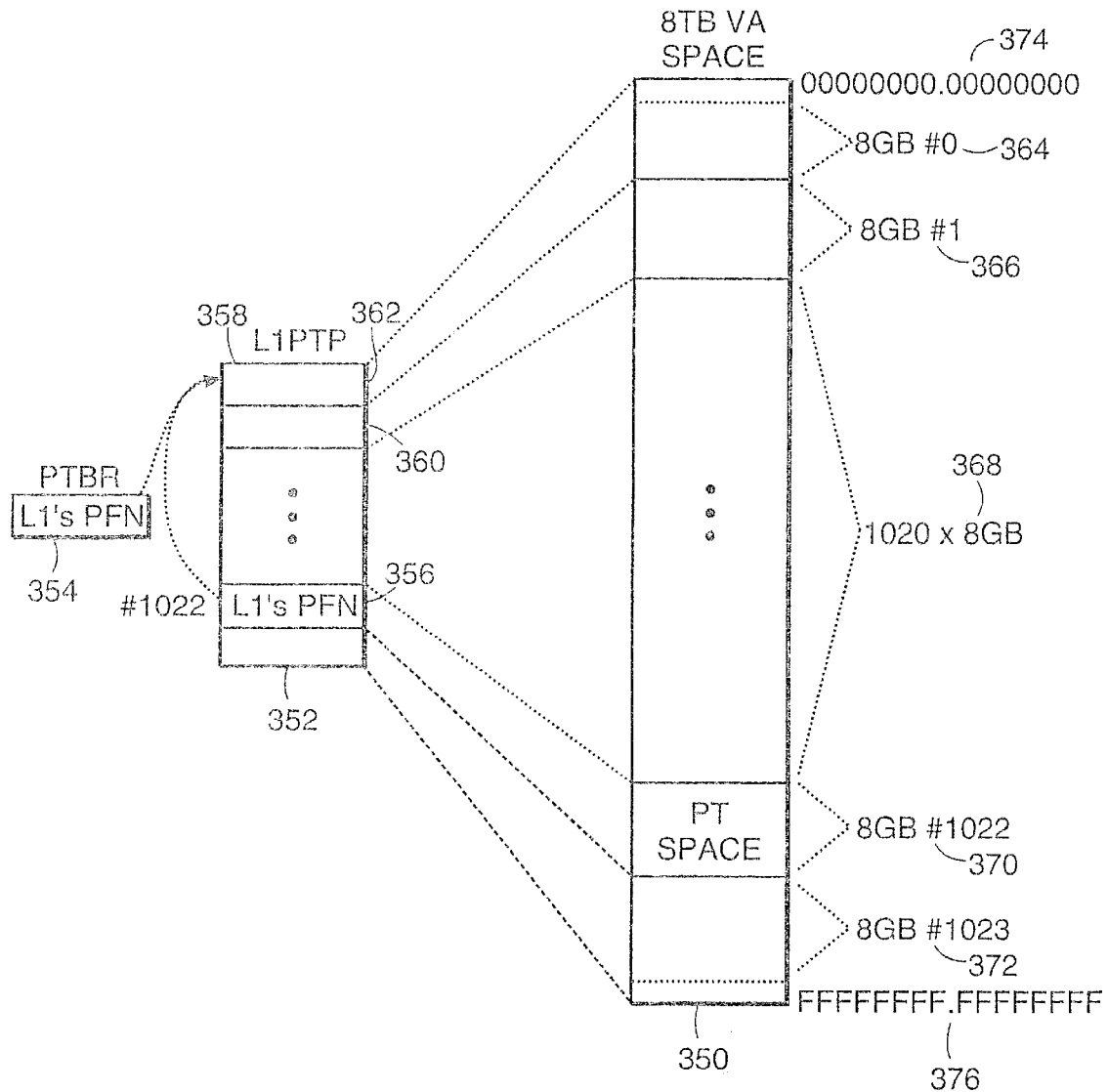
FIG. 6 is a block diagram showing an example embodiment of a self-mapped page table.

FIG. 6 shows an example embodiment of a self-mapped page table 358. The self-mapped page table 358 is for example the highest level page in a hierarchical tree structure of page table pages as shown in FIG. 5. In the example embodiment page table 358 in FIG. 6 corresponds with the level 1 page table page 214 as shown in FIG. 5. For purposes of clarity, the level 2 page table pages and level 3 page table pages are not shown in FIG. 6.

The page frame number of the self-mapped page table 358 in the example embodiment of FIG. 6 is shown contained within the page table base register (PTBR) 354. Thus the contents of the PTBR 354 indicates the base of the self-mapped page table 358. The self-mapped page table 358 is shown including a number of page table entries, shown for example as page table entry 362, page table entry 360, page table entry 356, and page table entry 352. In the example embodiment shown in FIG. 6, the page table 358 is one page in length, where a page is eight kilobytes, and the size of each page table entry is eight bytes. Accordingly there are 1,024 total page table entries in the self-mapped page table 358, numbered from zero through 1023.

Further shown in FIG. 6 is a virtual address space 350. The virtual address space 350 is for example shown to include virtual addresses between a lowest virtual address 374, shown for example as 00000000.00000000 (hexadecimal), and a highest virtual address 376, shown for example as FFFFFFFF.FFFFFFFF(hexadecimal). The virtual address space 350 is shown for example divided into 1,024 virtual segments, each virtual segment being equal to eight gigabytes (8GBs) in length. The virtual segments are shown as segment 0 364, segment 1 366, followed by 1,020 virtual segments 368, segment 1022 370, and segment 1023 372. Thus the virtual address space 350 is potentially eight terabytes (8TB) in size.

Each segment in the virtual address space 350 is mapped by one of the page table entries found in the self-mapped page table 358. For example, page table entry 362 maps virtual segment 0 364, page table entry 360 maps virtual segment 1 366, etc. Page table entry 356, the 1022nd PTE in the self-mapped page table 358, is the "self-mapper" PTE. Page table entry 356 maps the 1022nd virtual segment 370 of the virtual address space 350. Accordingly during operation of the elements shown in FIG. 6, references made to the 1022 nd virtual segment 370 in the virtual address space 350 result in accesses to page table space. Page table space therefore includes those virtual addresses used to access the self-mapped page table 358, and all level 2 and level 3 page table pages in the example embodiment as shown in FIG. 5.

During operation of the elements shown in FIG. 6, the virtual address space 350 consists of a collection of identically sized, contiguous address range segments, each one mapped by a correspondingly positioned PTE in the page table 358. The base address for page table space in FIG. 6 incorporates the index of the chosen self-mapper L1 PTE (3FE(16)) as follows (see FIG. 5):

| | |
|---|---|
| Segment 1 bitfield = 3FE | VA = FFFFFFFC.00000000 |
| Segment 2 bitfield = 0 | (a.k.a. *PT_Base") |
| Segment 3 bitfield = 0 | |
| Byte within page = 0 | |

Figure 7:
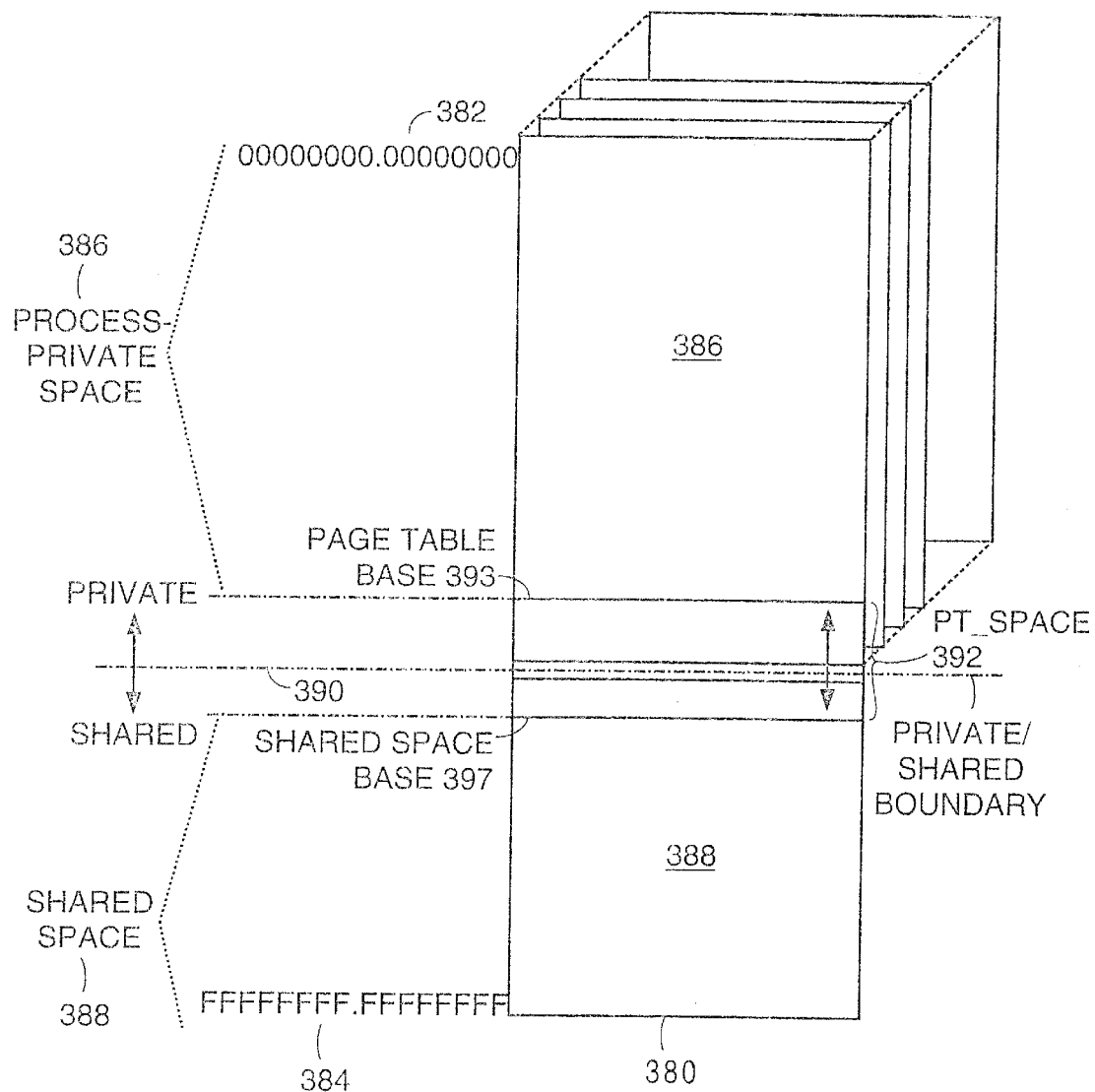
FIG. 7 is a block diagram showing an example embodiment of a virtual memory system having a private/shared boundary dividing a self-mapped page table space, and where the page table space itself separates process private space and shared space.

FIG. 7 shows an example embodiment of a virtual address space including a page table space separating a process private space from a shared space. FIG. 7 further shows a private/shared virtual address boundary dividing process private page table entries and shared page table entries, for example contained in a self-mapped page table.

In FIG. 7 a virtual address space 380 is shown including a process private space 386, a shared space 388, and a page table space 392. The virtual address space 380 is shown extending between a lowest virtual address 382 shown for example as 00000000.00000000 (hexadecimal) to a highest virtual address 384 shown for example as FFFFFFFF.FFFFFFFF (hexadecimal). The process private space 386 is shown for example within the virtual addresses below the page table space 392. The shared space 388 is shown for example within the virtual addresses above the page table space 392.

A private/shared boundary 390 is shown in FIG. 7 dividing the page table space 392. The private/shared boundary 390 lies at the higher addressed end of the level 1 page table page 358. All page table entries located in addresses below the private/shared boundary 390 are process private page table entries. All page table entries located in addresses greater than or equal to the private/shared boundary 390 are shared page table entries. The level 1 page table entries that exist between the self-mapper page table entry 356 and the private/shared boundary 390 are process private copies of level 1 page table entry values that map the set of shared page table entries that are located in addresses greater than or equal to the private/shared boundary 390.

In summary, the page table entries located in addresses below the private/shared boundary 390 map the process private space 386, the virtual space in which those page table entries themselves reside, and include the highest level page table entries that map all lower level page table entries that map shared space 388. Accordingly, all page table entries within the page table space 392 that are located in virtual addresses greater than or equal to the private/shared boundary 390 are those lower level page table entries that map shared space 388. Those lower level page table entries that map shared space 388 also map the virtual space within page table space in which those lower level page table entries themselves reside. Page table entries at locations greater than or equal to the private/shared boundary 390 are shared, and are accessible to any current process. Page table entries below the private/shared boundary 390, including those page table entries in the highest level page of the page table structure, are process private, and accordingly are associated with a specific process only when that specific process is current are the process private page table entries associated with that process accessible.

The page table entry within the page table space 392 having the lowest virtual address is located at a boundary referred to as page table base 393. The address of the first page within the shared space 388 following the page table space 392 is referred to as shared space base 397.

Figure 8:
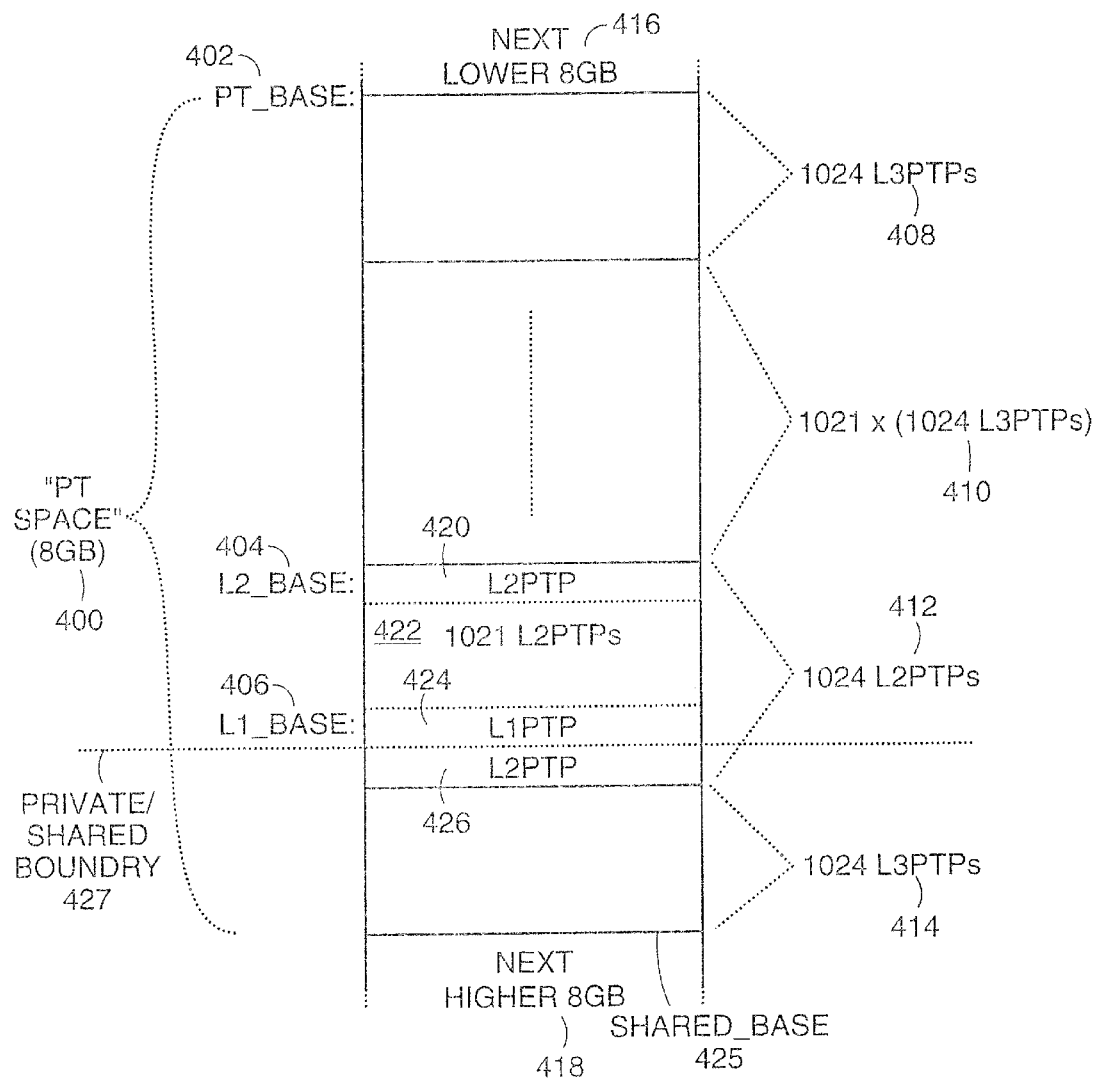
FIG. 8 is a block diagram showing an example embodiment of a page table space.

FIG. 8 shows an example embodiment of a self-mapped page table space as shown for example in element 392 of FIG. 7 or within element 370 in FIG. 6. FIG. 8 shows an 8GB page table space 400 beginning at a page table base virtual address 402. The page table format of the page table space shown in FIG. 8 is for example defined by the tree structure described in FIG. 5. Accordingly within the page table space 400 there is shown a first set of 1024 level 3 page table pages 408, followed by 1021 sets of 1024 level 3 page table pages 410. Following the level 3 page table pages 410 and beginning at an address level 2 base (L2__Base) 404 there is shown a level 2 page table page 420, followed by 1021 level 2 page table pages 422. Following the 1021 level 2 page table pages 422, there is at the address level 1 base (L1__Base) 406 a level 1 page table page 424. The level 1 page table page 424 is also shown as level 1 page table page 358 in FIG. 6 and level 1 page table page 214 in FIG. 5. The address of the level 2 page table page 426 following the level 1 page table page 424 is the private/shared virtual address boundary 427 for the example virtual address space shown in FIG. 8.

Further with reference to the elements shown in FIG. 8, the level 1 page table page 424 contains the self-mapper PTE. The relative position of the self-mapper PTE within the level 1 page table page 424 determines the virtual addresses of page table base (PT__Base) 402, the level 2 base address (L2__Base) 404, and the level 1 base address (L1__Base) 406. Following the level 2 page table page 426 there is shown 1024 level 3 page table pages 414. After the 1024 level 3 page table pages 414, the address of next higher 8GBS is the base address (Shared__Base) 425 of the shared space 388 for the virtual address space shown in FIG. 7, also shown as beginning at 418 in FIG. 8. Further, the level 2 page table page 426, level 1 page table page 424, 1,021 level 2 page table pages 422, and level 2 page table page 420 are all shown within a set of 1024 level 2 page table pages 412.

FIG. 8 shows the positional effect of choosing a particular high level PTE to self-map the page tables within PT space. For example the embodiment of FIG. 6 includes a self-mapper page table entry in page table entry number 1022. The location of the self-mapper in the example embodiment of FIG. 6 not only locates page table space as a whole in the 1022nd 8GB segment in virtual memory, it also determines that:

The 1022nd grouping of lowest level page table entries (for example L3PTPs) within page table space 400 is the collection of next higher level page table pages (for example 1024 L2 PTPs 412 ) that map the other groupings of L3 PTPs ( 408, 410 and 414 ), beginning at L2__Base 404:

Segment 1 bitfield = 3FE    VA = FFFFFFFD.FF000000
Segment 2 bitfield = 3FE    (a.k.a. "L2__Base")
Segment 3 bitfield = 0
Byte within page = 0

Within that block of L2 PTPs 412, the 1022nd L2PTP is actually the next higher level page table page that maps the L2PTPs, for example, the LLPTP. The L1PTP begins at L1__Base 406:

Segment 1 bitfield = 3FE    VA = FFFFFFFD.FF7FC000
Segment 2 bitfield = 3FE    (a.k.a. "L1__Base")
Segment 3 bitfield = 3FE
Byte within page = 0

Within the L1PTP 424, the 1022nd page table entry is the one used for self-mapping these page tables, specifically shown as the "self-mapper" page table entry 356 in FIG. 6.

In the example embodiment the virtual address of the self-mapper L1PTE 200 is for example:

Segment 1 bitfield = 3FE    VA = FFFFFFFD.FF7FDFF0
Segment 2 bitfield = 3FE
Segment 3 bitfield = 3FE
Byte within page = 3FE × 8

The above described positional relationships within page table space are preserved in alternative example embodiments in which a different top high level page table entry is chosen to be the self-mapper.

During operation of the example self-mapped page table space of FIG. 6 and FIG. 8 exactly as much virtual memory as is necessary is reserved for mapping the page table entries, regardless of page size or page table depth in a specific implementation. For example, consider the segment number bitfields ( 208, 206, 204 ) of a given virtual address having the format shown in FIG. 5. Concatenated together, these bitfields comprise a virtual page number (VPN) portion of that given virtual page. During operation of the elements shown in FIG. 8, the VPN may therefore be used as an index into page table space (from PT__Base 402 ) to obtain a page table entry mapping that given virtual address. The total size of page table space needed to map all virtual pages is the number of virtual pages ( 208, 206, and 204 concatenated) times the size of a page table entry (for example 8 bytes). The total size of the virtual address space mapped by page table space is the number of possible virtual pages times the page size. Factoring out the number of virtual pages from the equation, the difference between the size of page table space and the size of the virtual address space is the page size divided by the page table entry size, which is for example exactly the size of the segment 1 bitfield 208 in the example format of the virtual address shown in FIG. 5. As a result, the space mapped by a single page table entry at the highest level page table page is of exactly sufficient size for mapping all page table entries needed to map a process's total virtual address space. Accordingly, no additional system tuning or coding is required to accommodate future extensions of the virtual address format shown in FIG. 5 to use bits in the locations above Segment 1 208. By definition of the self-map effect, exactly as much virtual address space as is required will be available, no more and no less.

Further during operation of the elements shown in FIG. 8, the present system conveniently and efficiently locates a page table entry for a given virtual address. This results from the fact that the address of any page table entry is an efficient function of the virtual address that the page table entry maps. To determine the virtual address of the page table entry mapping a given virtual address, the present system begins by clearing the byte within page bitfield 202 of the given virtual address, then shifts the remaining bits of the given virtual address such that the bitfield values of Segments 1, 2, and 3 (see FIG. 5) now reside in the correspondingly next lower bitfield positions. The present system then writes the vacated Segment 1 field 208 with the index of the self-mapper page table entry. The present system further sign-extends the result by extending the value of the most significant bit in the new Segment 1 field 208 into the higher bit locations through bit 63. The final result is the virtual address of the page table entry that maps the original given virtual address. Note that this method applies also for a given virtual address within page table space, including that of the self-mapper page table entry itself.

Figure 9:
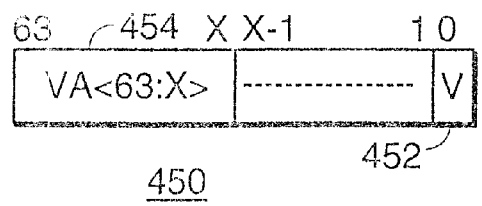
FIG. 9 is a block diagram showing an example embodiment of a working set list entry.

FIG. 9 shows an example embodiment of a working set list entry 450. The working set list is a process specific data structure describing the virtual memory used by the process. In the example embodiment of FIG. 9, the working set list is an array of working set list entries. As shown in FIG. 9 the working set list entry 450 includes a valid bit 452, and a VA field 454 containing the upper bits of a virtual address. In the example embodiment of FIG. 9, the VA field 454 includes bits X through 63 of a virtual address indicating a virtual page associated with the working set list entry 450. The number X is for example the number of byte within page bits in the virtual address format of the example embodiment of FIG. 9.

Each working set list entry 450 as shown in FIG. 9, describes a page of virtual memory mapped onto a physical page of memory by a page table structure associated with the process. When the valid bit 452 is set, the working set list entry 450 describes a process body page, page table page, or a process header page in shared space 28. Working set list entries are placed in the working set list in an order determined by the memory reference pattern of the process execution of the process for that working set list. Process body pages, page table pages, and process header pages, as well as invalid working set list entries, are thus contained within the working set list during operation of a process, in an indeterminate order.

A working set list index, referred to herein as WSLX, is an index into a working set list. The address of a given process's working set list is referred to herein as CTL_WSL, for purposes of example. CTL_WSL[WSLX] is an example working set list entry indexed by WSLX. For example, the first working set list index for each process is always 1 (0 is not used in this example), and the last working set list index for a given process is stored in a WS_LAST field of the process header (PHD) of the process. When a process is outswapped, the value of WS_LAST is typically much larger than the actual number of valid working set list entries. Thus, the working set list is typically "sparsely" populated at outswap time.

Figure 10:
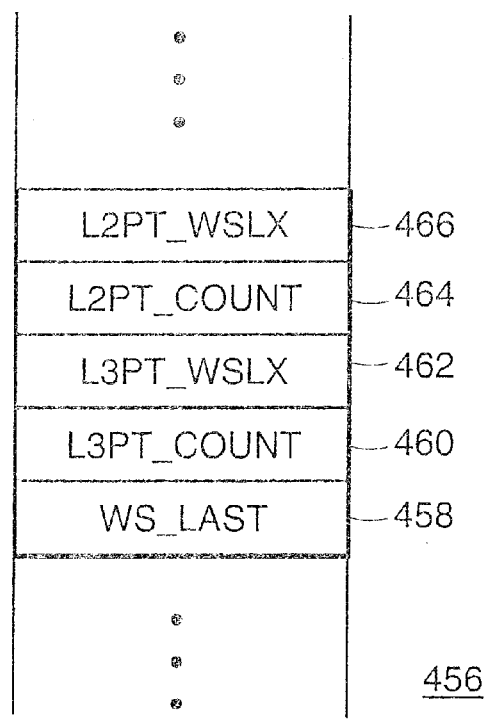
FIG. 10 is a block diagram showing an example embodiment of a process header.

FIG. 10 shows an example embodiment of a process header data structure 456. The process header 456 is a data structure, maintained by the operating system in shared space 28, describing aspects of an associated process that is resident within system memory. A process is said to be resident within system memory when it is schedulable by the operating system scheduler. A process must have certain of its essential data structures, including for example the process header 456, loaded into the system memory in order for it to be schedulable.

The example process header 456 in FIG. 10 includes five fields used during the outswap process to store page table related information. The field L2 PT_WSLX 466 contains a value equal to an index of a working set list entry for a first valid level 2 page table page in the working set list of the process associated with the process header 456. The field L2PT_COUNT 464 contains a value equal to the number of valid level 2 page table pages in the working set list of the associated process. The field L3PT_WSLX 462 contains a value equal to an index of a working set list entry for a first valid level 3 page table page in the working set list of the associated process. And the field L3PT_COUNT 460 contains a value equal to the number of valid level 3 page table pages in the working set list of the associated process.

In an example embodiment of the present system, the working set list index for the highest level page table page (for example level 1) is equal to the value 1, and the number of highest level page table pages is predetermined to be equal to 1 for any given process. Accordingly, in the example embodiment, these values need not be stored in the process header 456. Use of the fields within the process header 456 during process page table swapping is described below.

Figure 11:
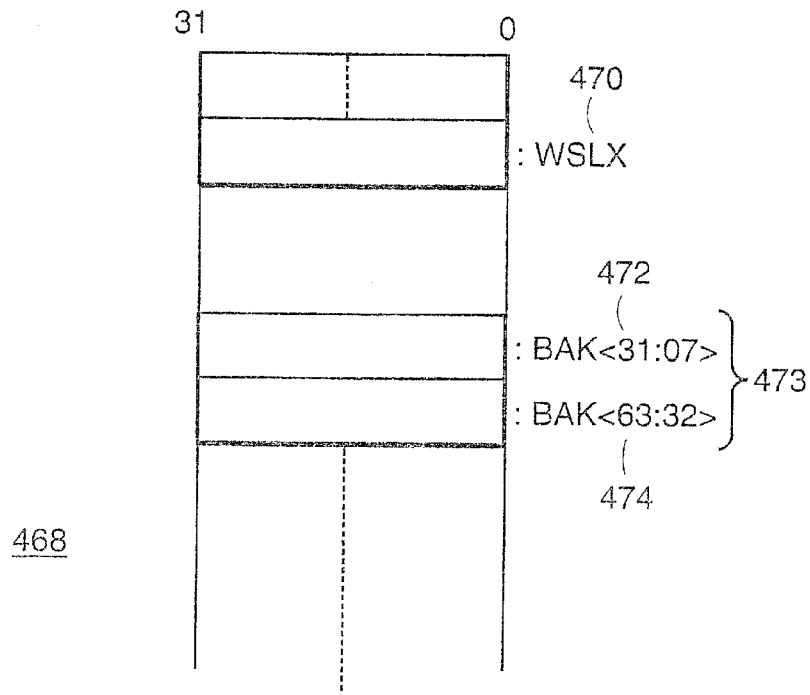
FIG. 11 is a block diagram showing an example embodiment of a physical page database entry.

FIG. 11 shows an example embodiment of a physical page database entry 468. The physical page database is also referred to herein as the PFN (for "page frame number") database. The PFN database is a system-wide data structure describing the state of individual physical memory pages. Each PFN database entry 468 describes the state of an associated physical memory page. The PFN database, in an example embodiment, is an array of PFN database entries, such as PFN database entry 468. The size of the PFN database is determined by the number of physical memory pages in the system.

Each of the PFN database entries 468 is comprised of a number of fields. Two fields of the PFN database entry 468 are used by the swapper process during page table swapping. These two fields are referred to as WSLX 470, and BAK 473. The contents of the WSLX 470 field is a value equal to an index into the working set list of a process at which is found a working set list entry for a virtual page mapped to the physical page of memory associated with the PFN database entry 468. The contents of the BAK 473 field is an address in backing storage for storing the contents of the physical page of memory. Within the BAK 473 field there is contained a first sub-field BAK<31:0> 472 and a second sub-field BAK<63:32> 474. In the example embodiment, the contents of sub-field 472 is always a value equal to 0 for those PFN database entries 468 associated with pages of physical memory storing page table pages. Accordingly the sub-field 472 is not used to indicate a backing storage address for the physical page of memory associated with the PFN database entry.

The system-wide address of the PFN database array is specified for example herein as PFN_DATABASE. The PFN database entry describing a given physical page of memory is found by using the PFN of that physical page of memory to index into the PFN database. For example, PFN_DATABASE [PFN] is the PFN database entry for the physical page of memory indicated by the page frame number PFN.

Figure 12:
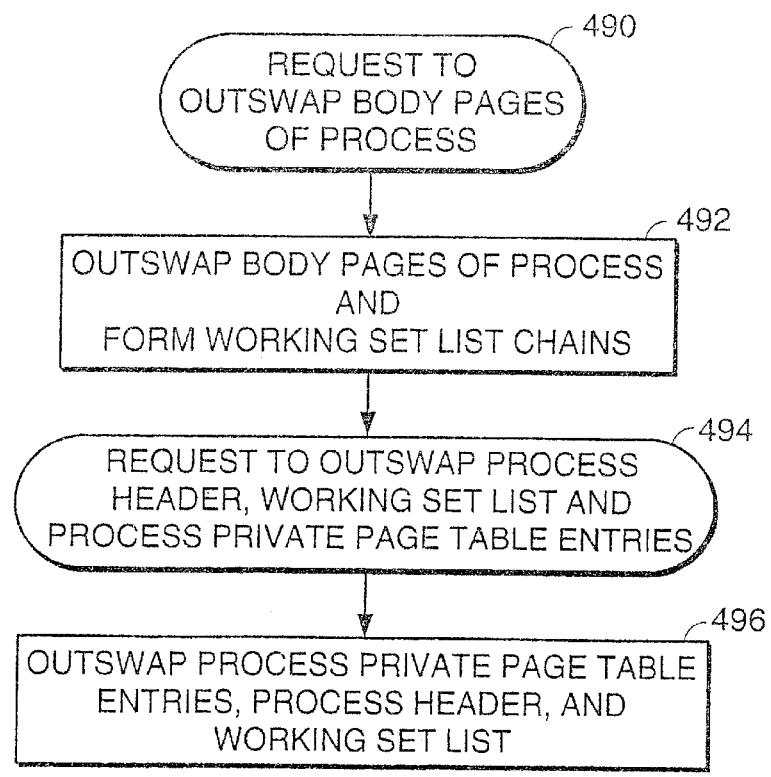
FIG. 12 is a flow chart showing steps performed by an example embodiment of a swapper process during an outswap operation.

FIG. 12 shows an example embodiment of steps performed by a swapper process during outswap of a resident process. At 490 the swapper process receives a request to outswap the "body pages" of the process which are defined as those pages containing process private code and data. Body pages of the process to be outswapped for example do not include process specific data structures such as page table pages or process header pages.

In response to the input 490, the swapper process outswaps the body pages of the process and forms one or more working set list chains at step 492. For example, in an example embodiment, at step 492 the swapper forms independent working set list chains for the level 2 page table pages and the level 3 page table pages of the process being outswapped. At step 492, the swapper process reads the working set list of the process to be outswapped and writes the page frame numbers (PFNs) corresponding to body pages of the process of the working set list entries in the swapper map in the same order as the pages appear in the working set list. A single I/O request is subsequently used to write the pages indicated by the PFNs in the swap map to a swap slot allocated to the process.

At 494 in FIG. 12, the swapper process receives a request to outswap the non-body pages of the process, for example the process header, working set list, and process private page table entries of the process whose body pages were previously outswapped at step 492. While in the example embodiment of FIG. 12, the request 494 is to outswap the process header, working set list, and process private page table entries, the present system will apply if the request 494 is only to outswap the page table pages. In response to the request 494, at step 496 the swapper process outswaps the process private page table entries, process header, and working set list. The swapper process uses the working set list chains formed at step 492 to outswap the process page table, and further moves the page table chain for each page table level into the PTEs of the next higher page table level.

Process Page Table Outswap

In an example embodiment, to perform the process header and page table outswap, the swapper process forms a "swap map". The swap map is an array of physical addresses (or "PFNs") that the swapper process presents to an input-output (I/O) subsystem for an I/O write to the swap slot in the swap file. The swap map contains for purposes of example:

1. PFNs of the process header pages (COUNT=PHD_COUNT).
2. PFN(s) of the level 1 page table page (COUNT=1).
3. PFNs of the level 2 page table pages (COUNT=SWP_PHD.L2PT_COUNT).
4. PFNs of the level 3 page table pages (COUNT=SWP_PHD.L3PT_COUNT).

For purposes of example, the variable PHD_COUNT is used to describe the number of pages contained in the process header. It is calculated by conventional means using the value stored in a process control block (PCB) for the associated process. The process control block (PCB) for an outswapped process is available while the process header is within the swap file. For purposes of example, the address of the swap map is stored in a global variable SWP_MAP. The swapper fills in the PFNs for the PHD pages by copying the PFNs from the PTEs that map the process header. Those PFNs are for purposes of example predetermined to be located at SWP_MAP[0] through SWP_MAP[PHD-COUNT - 1] within the swap map.

The page table PTEs in the swap map are filled in starting with level 3, the least significant level of the multi-level page table structure in the example embodiment, by traversing the page table chain for level 3. The level 2 page table chain is then similarly traversed. Proceeding in the order of increasing level of significance within the page table structure is provided to allow the system to write into the page table entry that maps a given page table page following it being written to the swap file. The level 1 page table page is then processed such that SWP_MAP[PHD_COUNT] is set to the PFN of the level 1 page table page.

The swap map is then submitted to the I/O system and all the PHD pages, level 1 page table page, level 2 page table pages, and level 3 page table pages are written to the swap file based on the contents of the swap map.

It is advantageous to outswap a process in stages. During a first stage, those pages of the process which contain code and data are outswapped. These pages are referred to as "body pages". Certain process specific data structures are not outswapped in this first stage, in case the process must be inswapped quickly. In a second outswap stage, those process specific data structures not outswapped with the body pages are outswapped.

Figure 13:
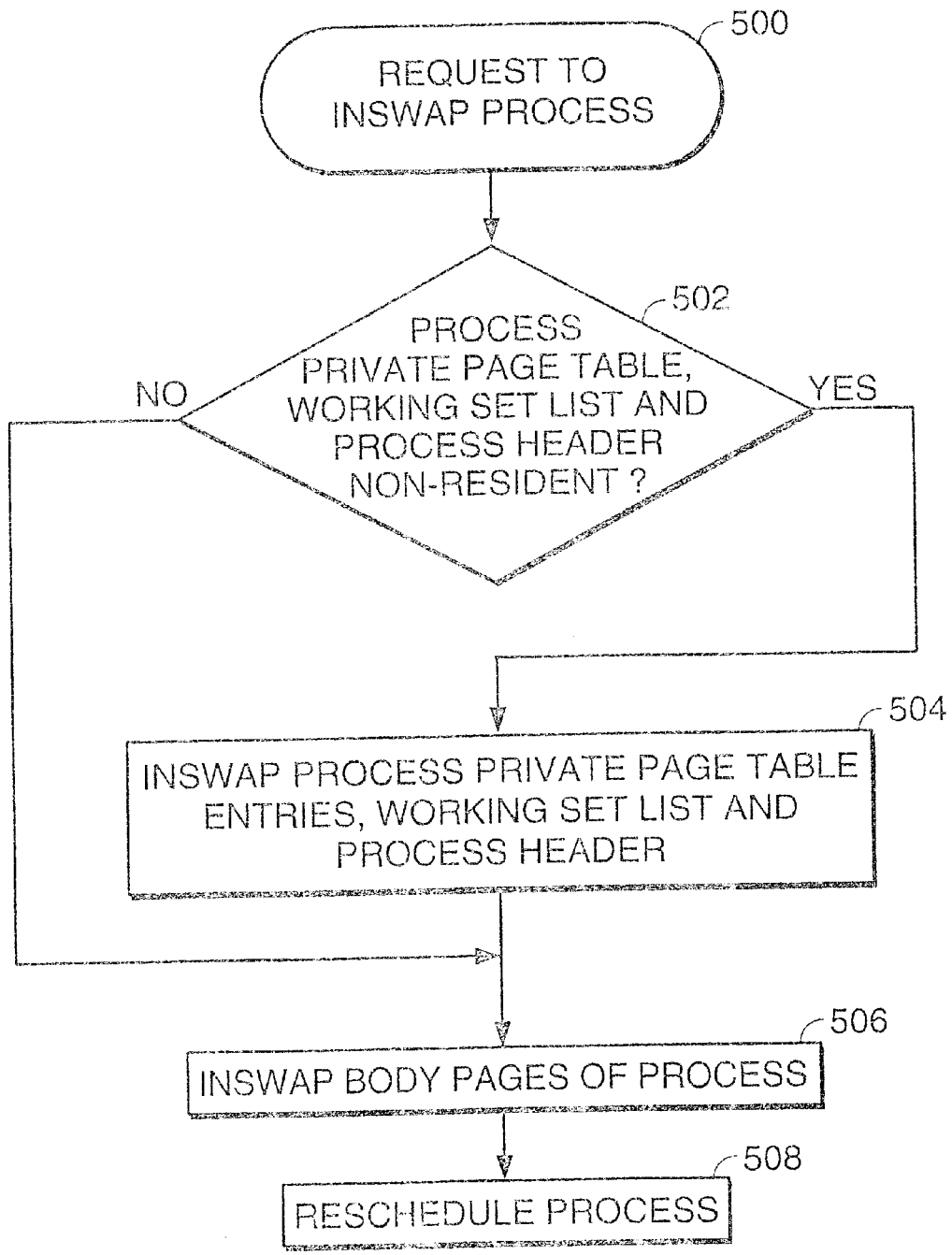
FIG. 13 is a flow chart showing an example embodiment of steps performed by a swapper process during an inswap operation.

FIG. 13 shows steps of an example embodiment swapper process during inswap of a process. At 500, the swapper process receives a request to inswap a specific process. In response to the request 500, at step 502, the swapper process determines whether process specific data structures such as the process private page table entries, working set list, and process header are currently resident. In an example embodiment, to determine whether the process private page table entries, working set list and process header are currently resident a bit is tested in the PCB. If the process header, working set list, and page table entries are not resident, step 502 is followed by step 504. Otherwise step 502 is followed by step 506. At step 504, the swapper process inswaps the process private page table pages, working set list, and process header for the specific process indicated in the request 500. The hierarchical page table structure is restored using the page table chains for each respective page table level. Step 504 is followed by step 506.

At step 506, the swapper process inswaps the body pages of the process indicated in the request 500. Step 506 is followed by step 508. At step 508 the process indicated by the request 500 is scheduled by a scheduler within the operating system for execution.

Figure 14:
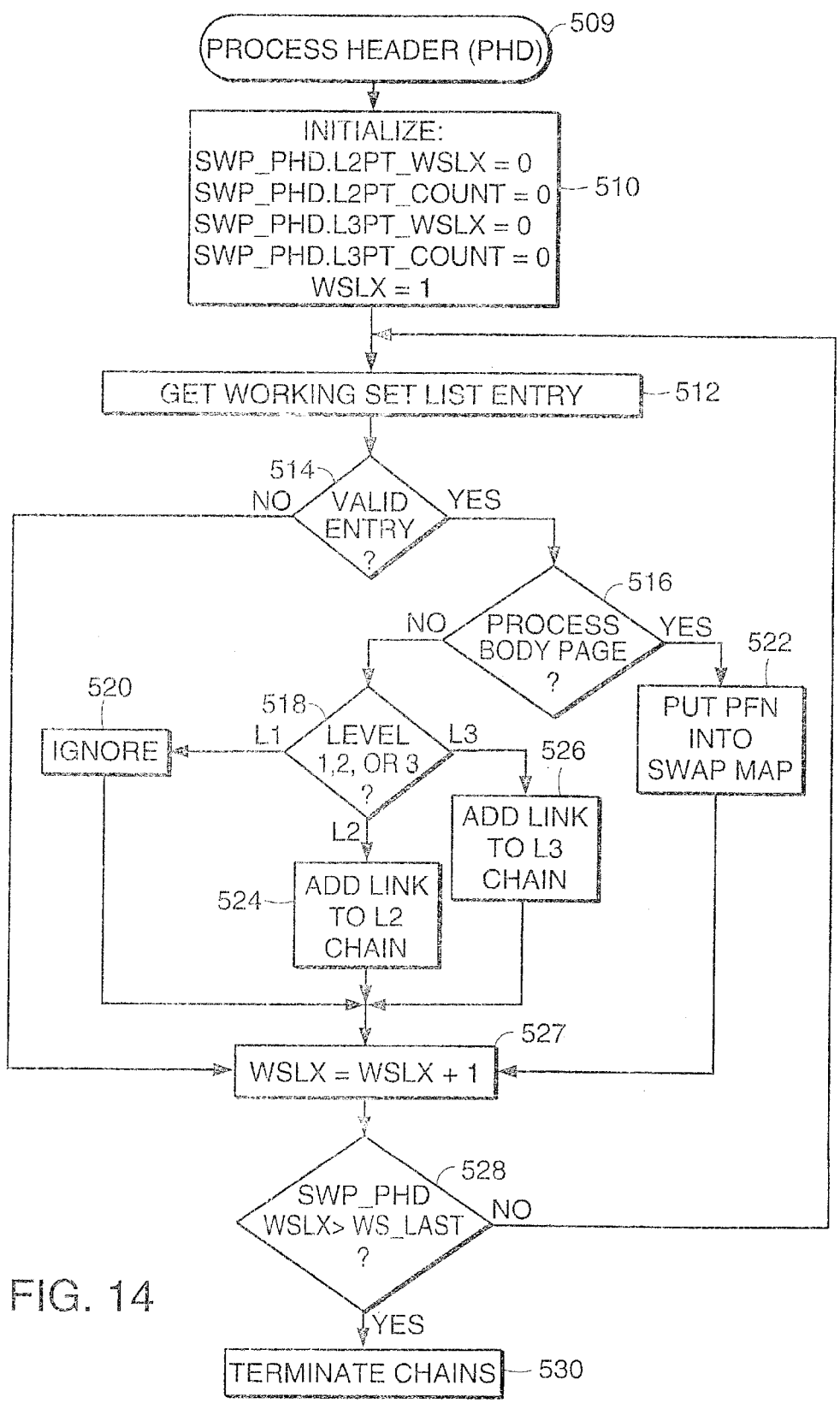
FIG. 14 is a flow chart showing an example embodiment of steps performed by a swapper process to outswap body pages of a process and form working set list chains.

FIG. 14 shows steps performed by an example embodiment of a swapper process in order to form level 2 and level 3 working set list chains. The steps shown in FIG. 14 are sub-steps within step 492 as shown in FIG. 12 during the outswap procedure.

A process header (PHD) 509 associated with the process to be outswapped is passed to the swapper process. At step 510, the swapper process inputs the process header 509, and performs initialization of fields within the process header 509. For purposes of example, the process header 509 is referred herein to as the structure SWP_PHD. Accordingly the sub-fields within the process header 509 are indicated for purposes of example herein by extensions to the symbol SWP_PHD. For example, at step 510, the swapper process sets the value of certain fields within the process header 509 to 0. Specifically, the L2PT_WSLX field, L2PT_COUNT field, L3PT_WSLX field, and L3PT_COUNT field are all set to zero at step 510. In addition, a local variable referred to as WSLX is set to the value 1 at step 510.

At step 512 the swapper process reads a working set list entry from the working set list of the process to be outswapped. At step 514 the swapper process determines whether the working set list entry read in step 512 is valid. For example, the swapper process checks a valid bit within the working set list entry. If at step 514 the working set list entry is determined to be valid, then step 514 is followed by step 516. Otherwise, step 514 is followed by step 527.

At step 516, the swapper process determines whether the working set list entry describes a virtual page that maps a process body page. If the working set list entry indicates a virtual page mapping a process body page, then step 516 is followed by step 522. Otherwise step 516 is followed by step 518.

At step 522, the swapper process writes the page frame number of the page of physical memory mapped by the virtual address indicated by the working set list entry obtained at step 512 into the swap map.

At step 518, the swapper process determines whether the virtual page of memory indicated by the working set list entry obtained at step 512 maps a physical page storing a level 1, level 2, or level 3 page table page. If the virtual page indicated by the working set list entry obtained at step 512 maps a physical page of memory storing a level 1 page table page, step 518 is followed by step 520. At step 520, the swapper process ignores that particular page.

If at step 518 the swapper process determines that the virtual page indicated by the working set list entry obtained at step 512 maps a page of physical memory storing a level 2 page table page, then step 518 is followed by step 524. At step 524, the swapper process adds a link to a level 2 page table chain. The level 2 page table chain is one of the working set list chains constructed at step 492 of FIG. 12.

If at step 518, the swapper process determines that the virtual page indicated by the working set list entry obtained at step 512 maps a physical page storing a level 3 page table page, then step 518 is followed by step 526. At step 526, the swapper process adds a link to a level 3 page table chain. The level 3 page table chain is one of the working set list chains formed at step 492 as shown in FIG. 12. Steps 520, 522, 524, and 526 are all followed by step 527. At step 527, the swapper process increments the local variable WSLX. Step 527 is followed by step 528.

At step 528, the swapper process determines whether the WSLX variable value is greater than the value of the WS_LAST field in the process header for the process being outswapped. If the WSLX variable value is greater, then step 528 is followed by step 530. At step 530 the swapper process terminates the level 2 and level 3 page table chains. Otherwise step 528 is followed by step 512. At step 512 the next working set list entry is obtained.

The steps 512 through 528 are then repeated for each of the remaining entries in the working set list for the process being outswapped.

Figure 15:
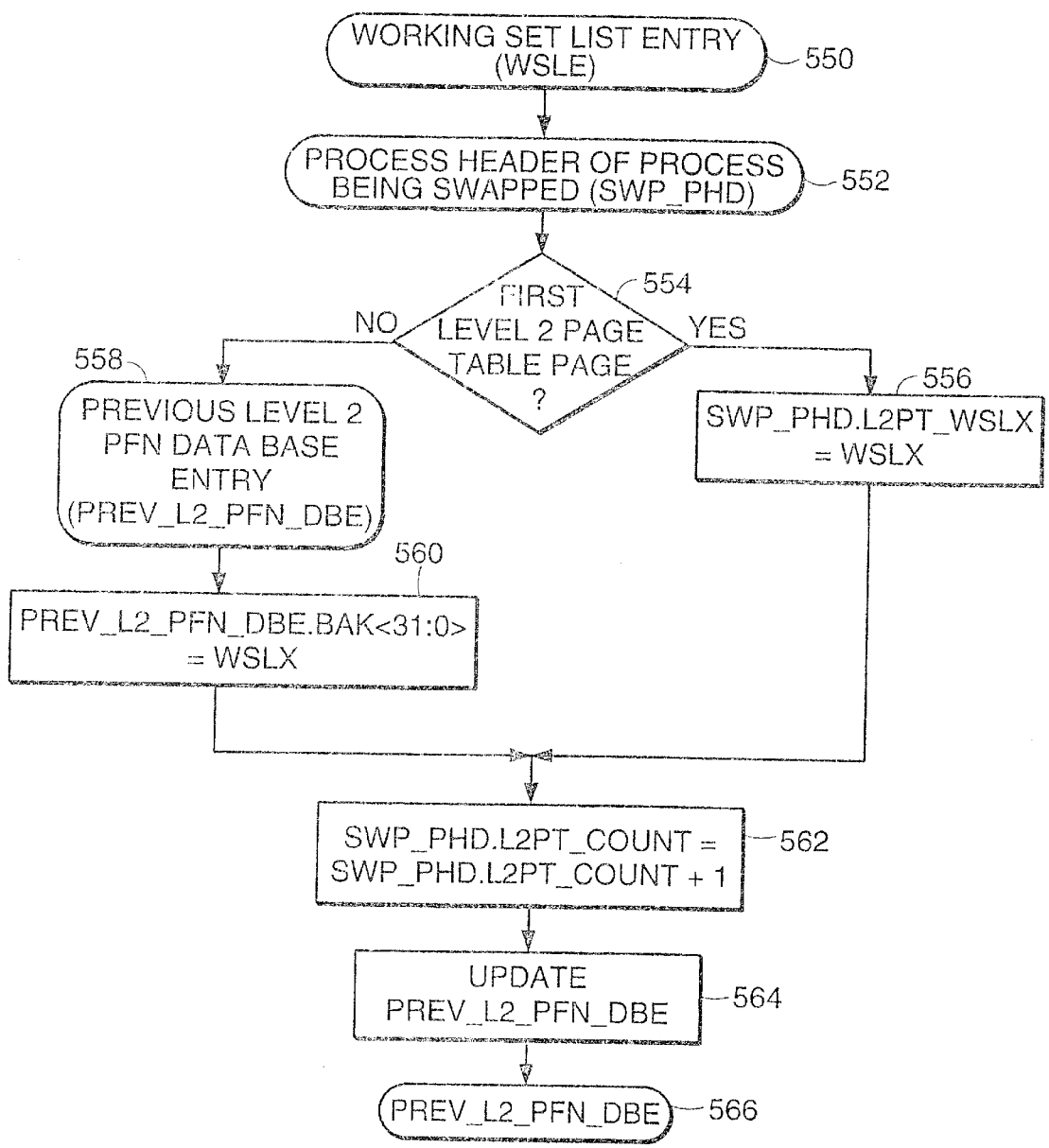
FIG. 15 is a flow chart showing an example embodiment of steps performed by a swapper process to add a link to a level 2 working set list chain.

FIG. 15 shows steps performed by an example embodiment of the swapper process to form a link in the level 2 page table chain. The steps shown in FIG. 15 are sub-steps within step 524 as shown in FIG. 14. A working set list entry (WSLE) 550 and a process header 552 of the process being outswapped are input to the swapper process in the steps shown in FIG. 15. For purposes of example, the process header 552 is referred to herein by the symbol, SWP_PHD.

At step 554, the swapper process determines whether the page table page stored in the virtual memory page indicated by WSLE 550 is the first level 2 page table page within the working set list for the process being outswapped. If at step 554, the swapper process determines that the page table page is the first level 2 page table page within the working set list of the process being outswapped, step 554 is followed by step 556. Otherwise step 554 is followed by step 558.

At step 556 the swapper process writes the value of the WSLX variable as described in FIG. 14, into the L2PT_WSLX field within the process header associated with the process being outswapped. Step 556 is followed by step 562.

At step 558, the swapper process passes a pointer to physical page database entry associated with a page of physical memory storing a previous level 2 page table page, for example as stored within a variable, PREV_L2_PFN_DBE.

The sub-field BAK<31:0> of the PFN database entry of step 558 is then used to store the value of the WSLX variable in step 560. Step 560 is followed by step 562.

At step 562, the swapper process increments the L2PT_COUNT field within the process header 552 for the process being outswapped. Step 562 is followed by step 564. At step 564 the swapper process gets the physical page database entry associated with the page of physical memory mapped to the virtual page indicated by the working set list entry obtained at step 512 during the current iteration of the system. The physical page database entry obtained at step 564 is then output, herein referred to for purposes of example by the label PREV_L2_PFN_DBE 566.

Figure 16:
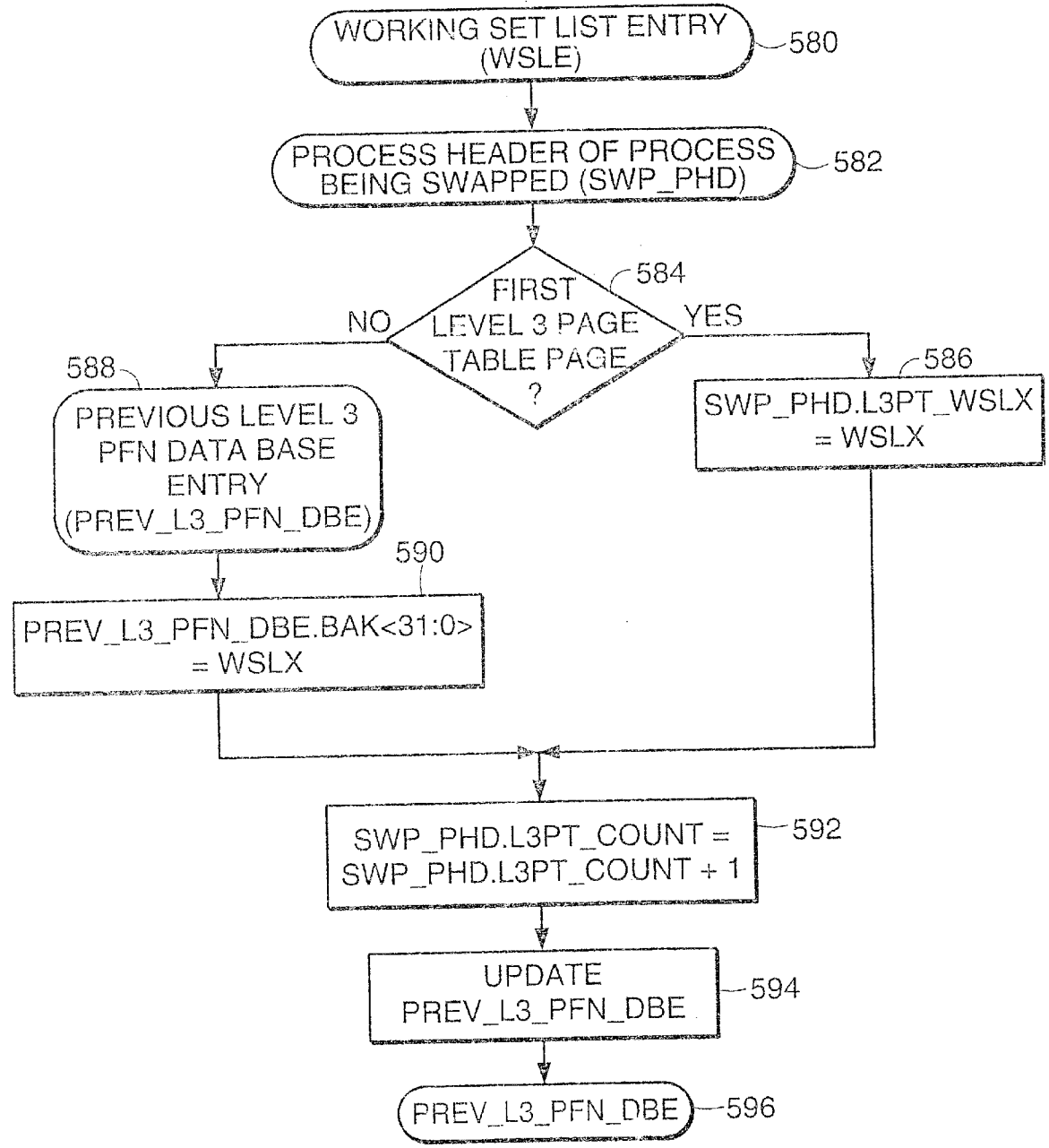
FIG. 16 is a flow chart showing an example embodiment of steps performed by a swapper process to add a link to a level 3 working set list chain.

FIG. 16 shows steps performed by an example embodiment of the swapper process to add a link to a level 3 page table chain. Inputs into FIG. 16 are the working set list entry 580 as obtained in step 512 of FIG. 14, and the process header of the process being outswapped (SWP_PHD) 582.

At step 584, the swapper process determines whether the level 3 page table page stored in the page of physical memory mapped by the virtual page indicated by the working set list entry 580 is the first level 3 page table page within the working set list of the process being outswapped. If it is the first level 3 page table page, step 584 is followed by step 586. Otherwise step 584 is followed by step 588. At step 586, the swapper process writes the value of the variable WSLX into the L3PT_WSLX field within the process header 582 of the process being outswapped. Step 586 is followed by step 592. At 588, the swapper process reads the physical page database entry PREV_L3_PFN_DBE associated with the previous level 3 page table page. 588 is followed by step 590.

At step 590, the swapper process writes the value of the WSLX local variable into the sub-field of the physical page database entry passed in step 588 and referred to for purposes of example as the BAK<31:0> sub-field. Step 590 is followed by step 592.

At step 592, the swapper process increments the L3PT_COUNT field within the process header 582 of the process being outswapped. Step 592 is followed by step 594. At step 594 the swapper process gets the physical page database entry associated with the page of physical memory mapped to the virtual page indicated by the working set list entry WSLE at step 580 during the current iteration of the system. The physical page database entry obtained at step 594 is then output, referred to for purposes of example by the label PREV_L3_PFN_DBE.

Figure 17:
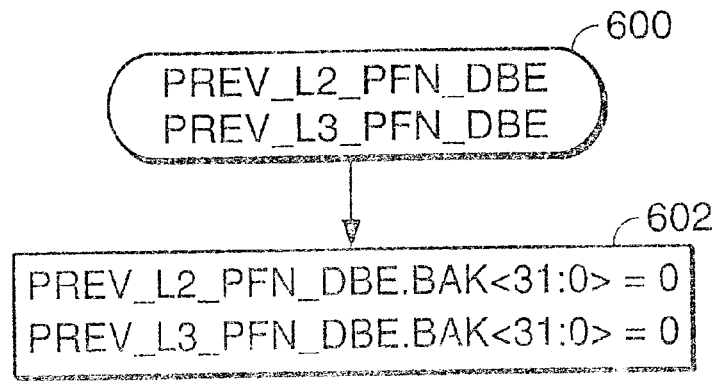
FIG. 17 is a flow chart showing an example embodiment of steps performed by a swapper process to terminate one or more working set list chains.

FIG. 17 shows steps followed by an example embodiment of the swapper process to perform step 530 as shown in FIG. 14 to terminate the level 2 and level 3 page table chains. The physical page database entries for the last chain links within the level 2 and level 3 chains, referred to for example in connection with FIG. 17 as PREV_L2_PFN_DBE and PREV_L3_PFN_DBE, respectively, are shown as input 600. At step 602, the swapper process sets the value of the sub-fields BAK<31:0> within both PREV_L2_PFN_DBE and PREV_L3_PFN_DBE to 0. In this way the swapper process terminates both the level 2 and level 3 page table chains.

Figure 18:
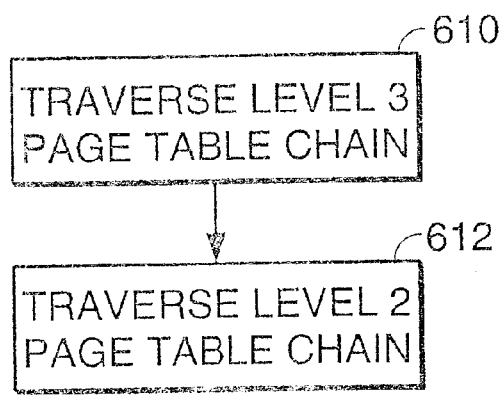
FIG. 18 is a flow chart showing an example embodiment of steps performed by a swapper process to outswap process private page table entries.

FIG. 18 shows steps performed by an example embodiment of the swapper process to perform step 496 as shown in FIG. 12. At step 610 in FIG. 18, the swapper process traverses the level 3 page table chain. Step 610 is followed by step 612. At step 612, the swapper process traverses the level 2 page table chain. Upon completion of the steps shown in FIG. 18 the page table chains are all stored in the next higher level of page table entries in the page table structure.

Figure 19:
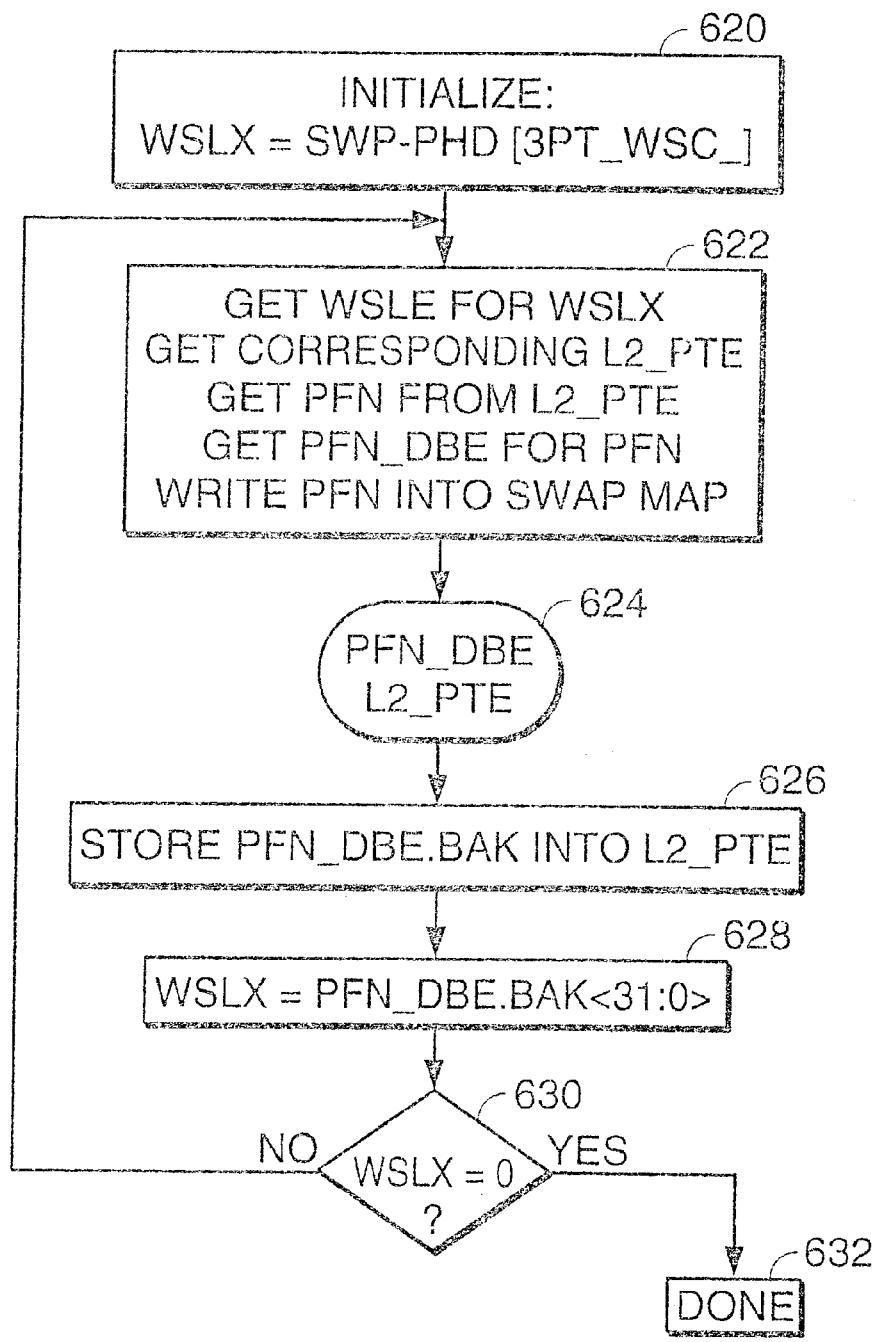
FIG. 19 is a flow chart showing an example embodiment of steps performed by a swapper process to traverse a level 3 page table chain during an outswap operation.

FIG. 19 shows steps performed by an example embodiment of the swapper process to traverse the level 3 page table chain during an outswap procedure. The steps shown in FIG. 19 are performed within step 610 as shown in FIG. 18.

At step 620 in FIG. 19, the swapper process performs initialization by setting the WSLX variable value to the value contained within the L3PT_WSLX field of the process header for the process being outswapped. Step 620 is followed by step 622. At step 622, the swapper process obtains the physical page database entry for the current page table page in the level 3 page table chain and obtains the address of the level 2 page table entry mapping the level 3 page table page. Specifically at step 622, the swapper process obtains the working set list entry indexed by the value of the variable WSLX, and obtains the address of the corresponding level 2 page table entry mapping the current level 3 page table page in the level 3 page table chain. Further at step 622 the swapper process obtains the page frame number of the current level 3 page table page from the level 2 page table mapping that level 3 page table page. Also at step 622, the swapper process obtains the PFN database entry for the physical page storing the current level 3 page table page within the level 3 page table chain. At step 622, the swapper process writes the page frame number (PFN) of the current level 3 page table page physical address into the swap map for purposes of swapping that page to secondary storage.

The output 624 of step 622 includes the physical page database entry (PFN_DBE) for the physical page of memory storing the level 3 page table page and the address (L2_PTE) of the level 2 page table entry mapping that level 3 page table page. The output 624 of step 622 is input to step 626. At step 626, the swapper process stores the value of the BAK field from the physical page database entry associated with the page of physical memory storing the level 3 page table page into the level 2 PTE mapping that level 3 page table page. Step 626 is followed by step 628.

At step 628 the swapper process writes the value of the BAK<31:0> sub-field of the physical page database entry PFN_DBE in output 624 into the local WSLX variable. Step 628 is followed by step 630. At step 630 the swapper process determines whether the end of the level 3 page table chain has been reached by checking if the WSLX value is equal to zero. If the WSLX value is equal to zero at step 630, step 630 is followed by step 632, as the level 3 page table chain has been completely traversed. Steps 622 through 630 are repeated for the remaining level 3 page table chain links.

Figure 20:
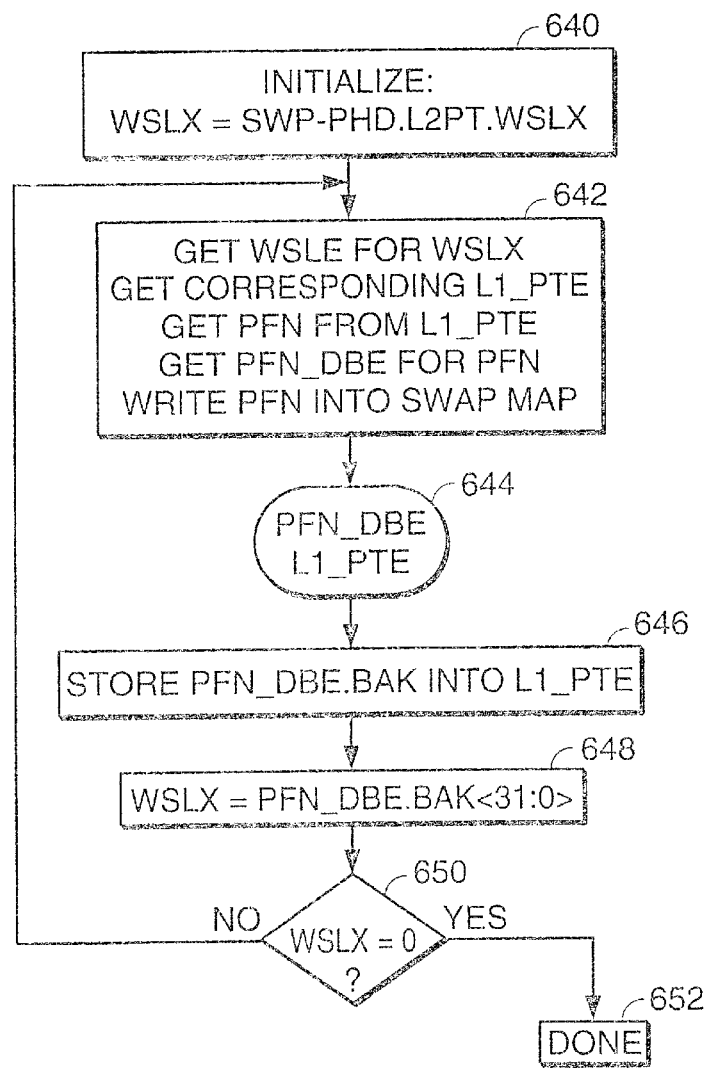
FIG. 20 is a flow chart showing an example embodiment of steps performed by a swapper process to traverse a level 2 page table chain during an outswap operation.

FIG. 20 shows steps performed by an example embodiment of the swapper process to traverse the level 2 page table chain during an outswap procedure. Steps shown in FIG. 20 are steps performed during step 612 as shown in FIG. 18. At step 640, the swapper process initializes a WSLX variable to a value contained within the L2 PT_WSLX field of the process header for the process being outswapped. At step 642, the swapper process obtains the working set list entry within the working set list of the process being outswapped, that is indexed by the value of WSLX variable. Further at step 642, the swapper process obtains the address of the level 1 page table entry that maps the level 2 page table page stored in the physical page of memory mapped by the virtual page indicated by the working set list entry which is indexed by the value of the local WSLX variable. Also at step 642, the swapper process obtains the page frame number from within the level 1 page table entry that maps the level 2 page table page. Also at step 642, the swapper process obtains the physical page database entry associated with the page frame number from within the level I page table entry mapping the level 2 page table page. The swapper process further writes the PFN from within the level 1 page table entry mapping the level 2 page table page into the swap map for purposes of swapping that page to secondary storage.

The swapper process output 644 from step 642 includes the physical page database entry (PFN_DBE) associated with the page of physical memory which stores the level 2 page table page, and the address (L1_PTE) of the level 1 page table entry mapping the level 2 page table page.

At step 646, the swapper process stores the value of the BAK field from within the physical page database entry (PFN_DBE.BAK) into the level 1 page table entry (L1_PTE) which maps the level 2 page table page.

At step 648, the swapper process writes the value of the BAK <31:0> sub-field of the physical page database entry (PFN_DBE.BAK<31:0>) into the local WSLX variable. At step 650 the swapper process determines if the end of the level 2 page table chain has been reached. For example, at step 650, the swapper process determines whether the value of the WSLX variable is equal to 0. If the value of the local WSLX variable is equal to 0, then step 650 is followed by step 652, which completes the steps shown in FIG. 20. Otherwise step 650 is followed by step 642. Thus steps 642, 644, 646, 648 and 650 are repeated until all of the links in the level 2 page table chain have been traversed.

When the working set list has been fully processed from beginning to end by the swapper process, and the page tables have been prepared for the outswap operation, the level 2 and level 3 page table pages are as a result linked together into separate, level-specific page table "chains" within the page tables themselves. These resultant page table chains are now described. The level 2 page table chain starts with for example SWP_PHD.L2PT_WSLX, the WSLX of the first valid level 2 page table page that was encountered during linear processing of the entries in the working set list. The index of the next level 2 page table page that was encountered in the working set list is stored in the level 1 page table entry (for example bits <31:0> that maps the current level 2 page table page, and so forth. The level 2 page table chain ends with a level 1 page table entry having bits <31:0> equal to 0. The field SWP_PHD.L2PT_COUNT contains the number of level 2 page table pages in the chain.

The level 3 page table chain starts with SWP_PHD.L3PT_WSLX, the index of the working set list entry for the first valid level 3 page table page that was encountered during the linear processing of the working set list. The index of the working set list entry for the next level 3 page table page that was encountered in the working set list is found in the level 2 page table entry (for example in bits <31:0>) that maps the current level 3 page table page. The list of level 3 page table pages ends with a level 2 page table entry having bits <31:0> equal to 0. The field SWP_PHD.L3 PT_COUNT contains the number of level 3 page table pages in the chain.

The above example embodiment has been described purely for purposes of example as having a hierarchical page table structure of three levels. However, the present system of building working set list index chains can be applied generally to systems having any arbitrary number of levels in a hierarchical page table structure.

Process Page Table Inswap

In an example embodiment of the present system the swapper process performs process header and page table inswap by reconstructing the swap map for the outswapped process with newly allocated page frame numbers. The swapper process then presents the swap map to the I/O sub-system for an I/O read of the appropriate swap slot in the swap file.

In an example embodiment of the swap map, it is an array of PFNs containing:

1. PFNs of pages to store the process header pages (COUNT=PHD_COUNT).
2. PFNs of pages to store the level 1 page table page (COUNT=1).
3. PFNs of pages to store the level 2 page table pages (COUNT=SWP_PHD.L2PT_COUNT).
4. PFNs of pages to store the level 3 page table pages (COUNT=SWP_PHD.L3PT_COUNT).
5. PFNs of pages to store the process body pages.

Once the requested I/O read is complete, the example swapper process maps the process header virtual addresses to the first PHD_COUNT PFNs in the swap map by modifying the shared PTEs that map the process header. The process header contents are then accessible through shared system space, including the page table chain list heads and element counts.

The swapper process then re-builds the process private page table pages starting with the level 1 page table page, then continuing with the level 2 and finally level 3 page table pages in the example embodiment. The page table pages are established in decreasing level order during inswap, where for example level 1 is the highest level order and level 3 is the lowest level order.

The level 1 page table pages are reestablished first. In the example embodiment, the physical address of the level 1 page table page is predetermined to be located in the swap map entry following those entries for pages used to store the process header of the process being inswapped. The PFN for the level 1 page table page is therefore obtained from SWP_MAP[PHD_COUNT]. The swapper process switches to using the level 1 page table page of the process to be inswapped thus addressing page table space of the process being inswapped.

Figure 21:
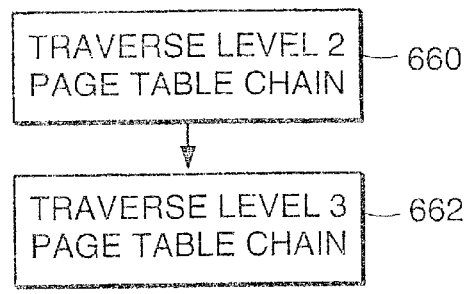
FIG. 21 is a flow chart showing an example embodiment of steps performed to inswap process private page table entries.

FIG. 21 shows steps performed by an example embodiment of the swapper process during inswap of process page table entries. The steps shown in FIG. 21 are for example performed during step 504 as shown in FIG. 13. At step 660, the swapper process traverses the level 2 page table chain to reconstruct the level 2 page table pages. Following step 660, at step 662, the swapper process traverses the level 3 page table chain to reconstruct the level 3 page table pages.

Figure 22:
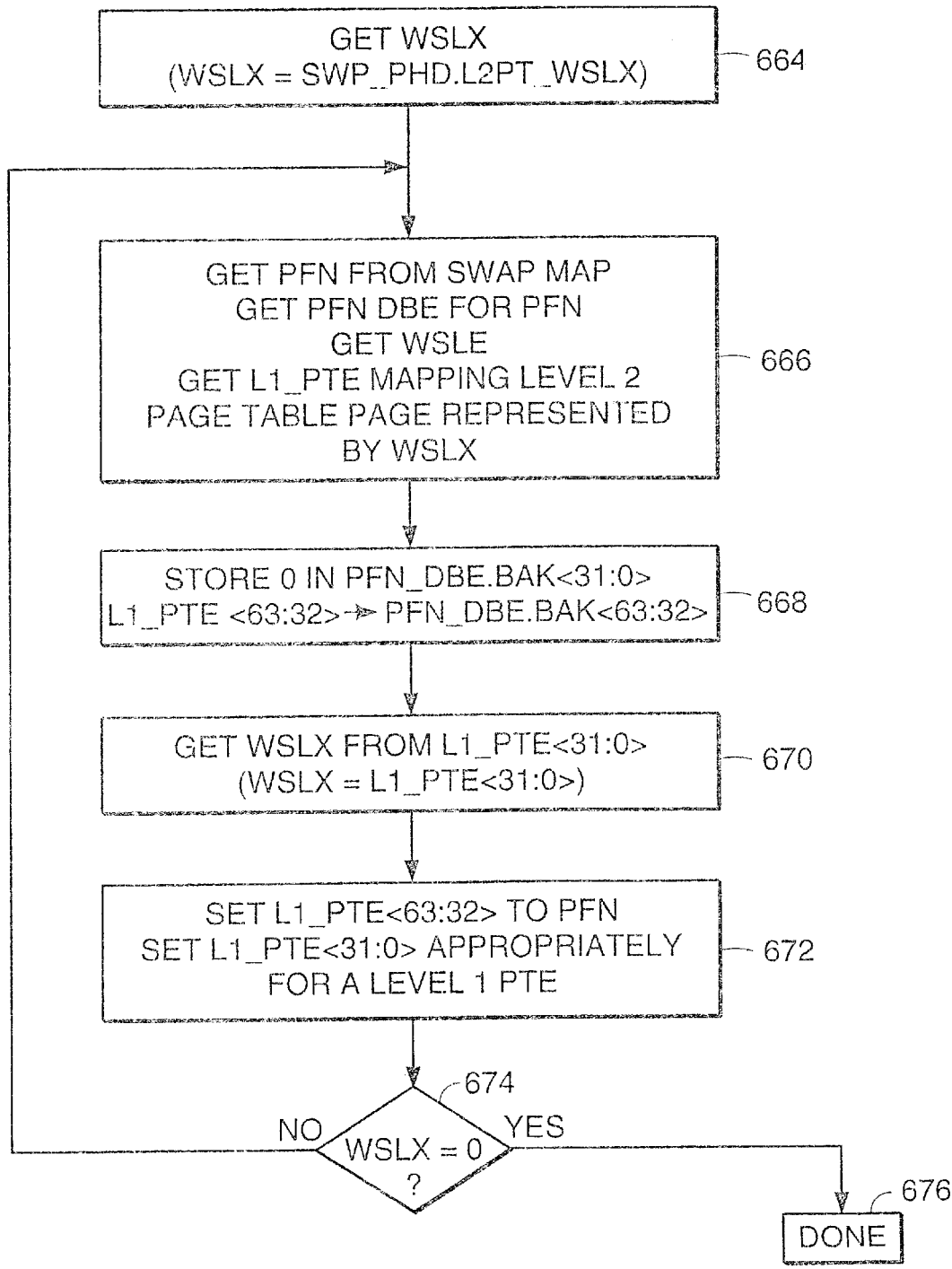
FIG. 22 is a flow chart showing an example embodiment of steps performed by a swapper process to traverse a level 2 page table chain during an inswap operation.

FIG. 22 shows steps performed by an example embodiment of the swapper process to traverse a level 2 page table chain during an inswap procedure. At 664 the swapper process obtains the working set list index for the beginning of the level 2 page table chain, for example by setting a variable WSLX to a value contained in the L2PT_WSLX field of the process header for the process being inswapped.

At step 666, the swapper process obtains a page frame number from the next entry in the swap map. Further at step 666 the swapper process obtains the physical page data base entry (PFN_DBE) for the physical page of memory indicated by the page frame number from the next entry in the swap map. Also at step 666 the swapper process obtains the working set list entry indicated by the current value of WSLX. Also at step 666, the swapper process obtains the level 1 page table entry mapping the level 2 page table page represented by the current value of WSLX.

At step 668 the swapper process stores a value of zero in the BAK <31:0> sub-field within the physical page database entry. Also at step 668 the swapper process loads BAK <63:32> within the physical page database entry with the value contained in bits 63 through 32 of the level 1 PTE (L1_PTE<63:32>) mapping a level 2 page table page represented by the working set list index in the physical page database entry. At step 670 the swapper process obtains a value for the local variable WSLX from bits 31 through 0 of the level 1 page table entry (L1_PTE<31:0>).

At step 672, the swapper process sets bits 63 through 32 of the level 1 PTE (L1_PTE<63:32>) to the value of the PFN obtained in step 666. Also at step 672, the swapper process sets bits 31 through 0 of the level 1 PTE (L1_PTE<31:0>) appropriately for a level 1 page table entry. For example, the valid bit should be set.

At step 674 the swapper process determines whether the level 2 page table chain has been completely traversed. For example, the swapper process determines whether the local variable WSLX value as updated in step 670 is equal to zero. If the WSLX variable value is equal to zero at step 674, step 674 is followed by step 676, as the level 2 page table chain has been completely traversed. Otherwise step 674 is followed by step 666. In this way steps 666, 668, 670, 672 and 674 are performed for each entry in the level 2 page table chain until the entire level 2 page table chain has been traversed.

Figure 23:
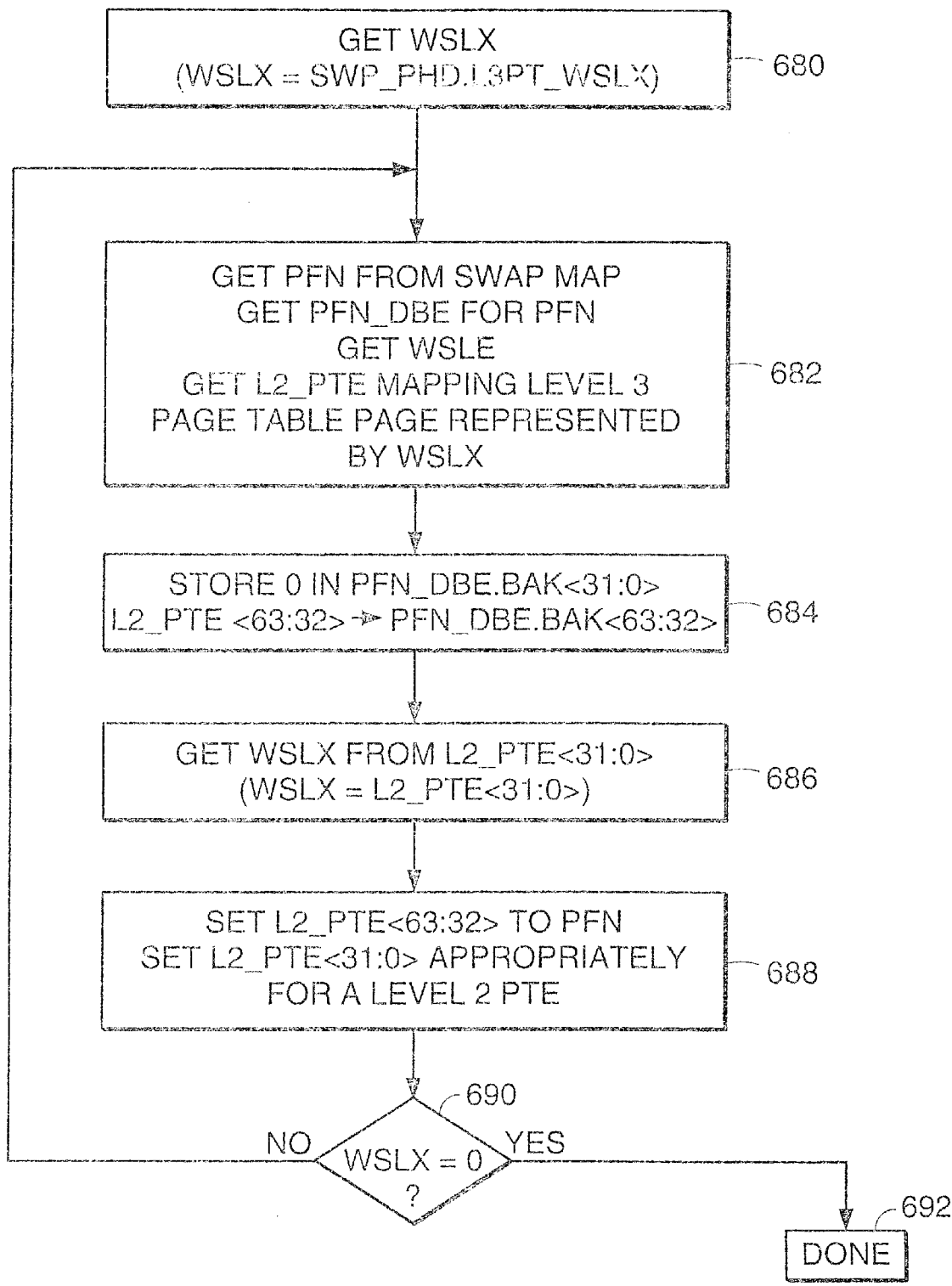
FIG. 23 is a flow chart showing an example embodiment of steps performed to traverse a level 3 page table chain by a swapper process during an inswap operation.

FIG. 23 shows steps performed by an example embodiment of a swapper process during traversal of a level 3 page table chain during an inswap procedure. The steps shown in FIG. 23 are an example of steps performed during step 662 as shown in FIG. 21. At step 680, the swapper process obtains an initial value for a local WSLX variable from the process header of the process being inswapped.

At step 682 the swapper process obtains a page frame number (PFN) from the next entry in the swap map. Also at step 682, the swapper process obtains the physical page database entry (PFN_DBE) associated with the PFN received from the I/O sub-system. Further at step 682, the swapper process obtains a working set list entry (WSLE) indexed by the local WSLX variable. Further at step 682 the swapper process obtains the level 2 page table entry (L2_PTE) mapping the level 3 page table page represented by the virtual address associated with WSLX.

At step 684, the swapper process stores a value of 0 in the BAK <31:0> sub-field (PFN_DBE.BAK<31:0>). Further at step 684, the swapper process sets the value of the BAK <63:32> sub-field within the physical page database entry (PFN_DBE.BAK<63:32>) to the value in bits 63 through 32 in the level 2 page table entry mapping the level 3 page table page represented by the working set list entry indexed by WSLX variable.

At step 686, the swapper process obtains a value for the local WSLX variable from bits 31 through zero of the level 2 page table entry (L2_PTE<31:0>).

At step 688, the swapper process sets bits 63 through 32 of L2_PTE to the value of the page frame number (PFN) obtained at step 682. Further at step 688 the swapper process sets bits 31 through zero of the level 2 PTE (L2_PTE<31:0>) appropriately for a level 2 page table entry. For example, the valid bit should be set. At step 690 the swapper process determines whether the level 3 page table chain has terminated. For example, the swapper process determines whether the updated value of the local WSLX variable equals zero at step 690. If the swapper determines at step 690 that the local WSLX variable value as updated in step 686 is equal to zero then step 690 is followed by step 692, as the complete level 3 page table chain has been traversed. Otherwise step 690 is followed by 682. In this way steps 682, 684, 686, 688 and 690 are repeated for all of the entries in the level 3 page table chain.

Figure 24:
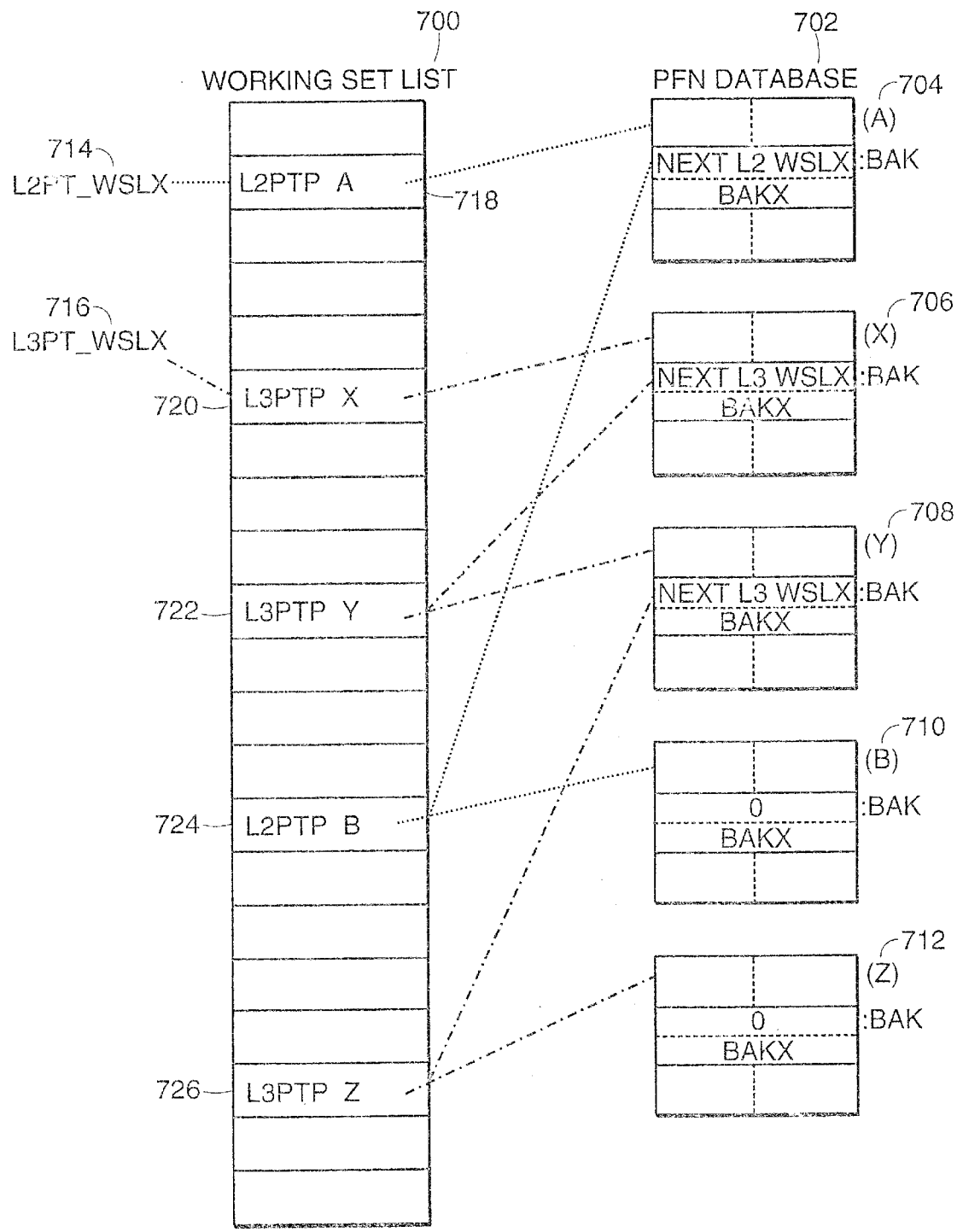
FIG. 24 is a block diagram showing an example embodiment of working set list chains for level 2 and level 3 of a hierarchical page table structure.

FIG. 24 illustrates page table chains formed by an example embodiment of the swapper process at the conclusion of step 492 in FIG. 12. In the example of FIG. 24, the working set list of the process contained two level 2 page table pages, A and B. L2PT_WSLX 714 contains for example the working set list index for page table page A 704. In the physical page database entry for page table page A 704, the BAK <31:0> sub-field contains the working set list index for page table page B 724. The BAK <31:0> sub-field of the physical page database entry for page table page B 710 is zero because there were no further level 2 page table pages in the working set list. FIG. 24 also shows for example a chain of level 3 page table pages, based on L3PT_WSLX 716. The level 3 page table pages are labeled for example, X, Y, and Z, each with a corresponding physical page database entry 706, 708, and 712.

The working set list chains shown in FIG. 24 are traversed by the swapper process during process page table outswap 496, where the working set chain links are contained in the physical page database entries. These chains serve to avoid repetitive traversal of the working set list to locate the working set list entries that describe the page table pages. During process page table outswap 496 the working set chain links are moved from the physical page database entries and into the next higher level page table entries of the process being outswapped. When the page tables are subsequently stored in the swap file, the working set chain links are also stored by virtue of having been moved into the next higher level page table entries.

Figure 25:
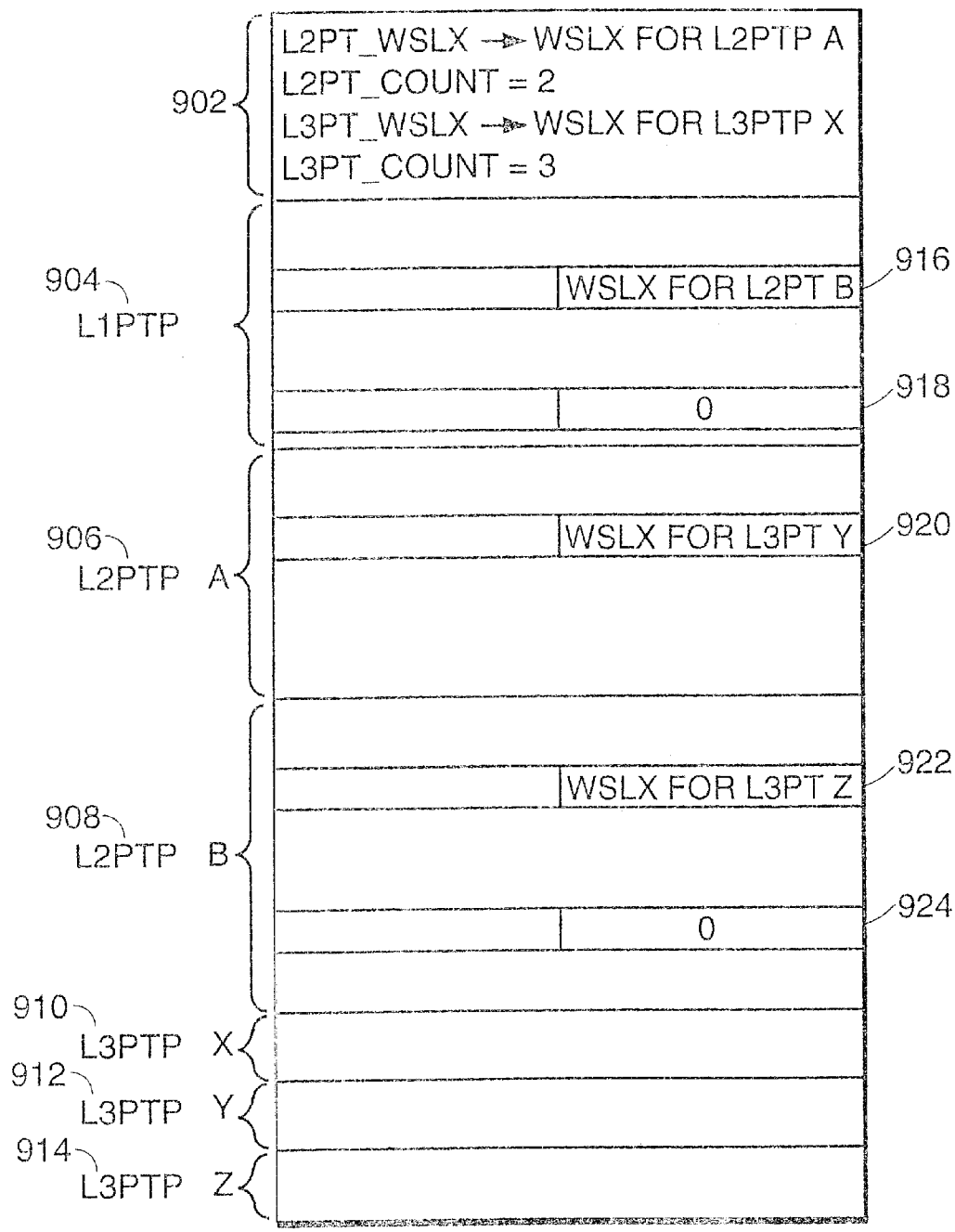
FIG. 25 shows an example embodiment of working set chain links stored in next higher level page table entries within a swap file.

FIG. 25 shows an example embodiment of working set chain links stored in next higher level page table entries within a swap file. The page table chains shown in FIG. 25 are for example formed at the conclusion of step 496 in FIG. 12. In the example of FIG. 25, the working set list of the process contained two level 2 page table pages, A 906 and B 908. Also in the example of FIG. 25, the working set list of the process contained three level 3 page table pages, X 910, Y 912 and Z 914. FIG. 25 shows the contents of a swap file to which the process's header pages, working set list, and page table pages 904, 906, 908, 910, 912 and 914 have been written.

In the example of FIG. 25, a process header page and working set list 902 is shown containing the working set list indices for the first level 2 page table page (L2PT_WSLX) and the first level 3 page table page (L3PT_WSLX), respectively, that were encountered during the original traversal of the working set list (FIG. 14).

Also in FIG. 25 is shown the level 1 page table page of the process (L1PTP 904 ), including a PTE 916 that previously mapped the level 2 page table page 906, and a PTE 918 that previously mapped the level 2 page table page B 908. The PTE 916 contains the page table chain link to the level 2 page table page B that was formerly stored in the PFN database entry 704 for the level 2 page table page A (FIG. 24). The PTE 918 is shown containing the example termination value of 0, indicating the end of the chain, and formerly stored in the in the PFN database entry 710 for level 2 page table entry B (FIG. 24).

Further in the example of FIG. 25 is shown a PTE 920 which previously mapped the level 3 page table entry X 910. The PTE 920 is shown including a page table chain link to the level 3 page table page Y 912. Also in FIG. 25 there is shown a PTE 922 which previously mapped the level 3 page table page Y 912 and which contains the page table chain link to the level 3 page table page Z 914. Also in FIG. 25 there is shown a PTE 924 which previously mapped the page table page Z 914 and which contains the example termination value of zero, indicating the end of the chain. The WSLX values in PTEs 920, 922, and 924, including the termination value of zero, previously were stored in the PFN database entries 706, 708 and 712. Thus it is shown in the examples of FIG. 24 and FIG. 25 that the page table chains constructed in step 492 (FIG. 12) and illustrated in FIG. 24 are moved to the higher level page table entries at step 496 (FIG. 12). The resultant swap slot in the swap file is shown in FIG. 25. During inswap, the example swap file as shown in FIG. 25 is used to efficiently reconstruct the page table pages, using the page table chains embedded in the PTEs. Rather than scanning the working set list multiple times to locate the pages of the process page tables, the swapper process utilizes the page table chains as described in FIG. 21.

While the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method for outswapping a process, comprising the steps of:

forming a working set list chain for a level of page table pages in a hierarchical page table structure, said working set list chain having one or more entries, said entries each indicating a working set list entry, each said indicated working set list entry describing a page of virtual memory mapping a page table page within said level of page table pages in said hierarchical page table structure; and locating and outswapping a number of page table pages of said process by traversing said working set list chain.

2. A method for outswapping a process, comprising the steps of:

forming a working set list chain for a level of page table pages in a hierarchical page table structure, said working set list chain having one or more entries, said entries each indicating a working set list entry, each said indicated working set list entry describing a page of virtual memory mapping a page table page within said level of page table pages in said hierarchical page table structure, wherein said forming is performed while outswapping a number of body pages of said process; and locating and outswapping a number of page table pages of said process by traversing said working set list chain.

3. The method of claim 2, wherein said outswapping of said number of body pages of said process includes traversing a working set list of said process, said working set list including one or more working set list entries, one or more of said working set list entries each describing a page of virtual memory.

4. The method of claim 3 wherein said traversing said working set list of said process includes determining whether each one of said working set list entries describes one of said page table pages within said level of page table pages in said hierarchical page table structure, and adding a link to said working set list chain if said one of said working set list entries describes one of said page table pages within said level of page table pages in said hierarchical page table structure.

5. The method of claim 4 wherein said adding a link to said working set list chain includes writing an index of said one of said working set list entries into a field within a physical page database entry associated with a page of physical memory storing a previous one of said page table pages within said level of page table pages in said hierarchical page table structure.

6. The method of claim 5 further comprising the step of storing said working set list chain in page table entries at a higher level of the page table hierarchy than the level of page table pages described by the working set list chain.

7. The method of claim 6 further comprising storing said page table entries at said higher level of said page table hierarchy and said working set list into a secondary storage device.

8. The method of claim 7 further comprising:

reading said working set list and said page table entries at said higher level of said page table hierarchy back from said secondary storage device; and traversing said working set list chain in said page table entries at said higher level of said page table hierarchy to restore said level of page table pages in said hierarchical page table structure.

9. A memory storage device capable of being read by a computer system, comprising:

means for forming a working set list chain for a level of page table pages in a hierarchical page table structure, said working set list chain having one or more entries, said entries each indicating a working set list entry, each said indicated working set list entry describing a page of virtual memory mapping a page table page within said level of page table pages in said hierarchical page table structure; and means for locating and outswapping a number of page table pages of a process by traversing said working set list chain.

10. A memory storage device capable of being read by a computer system, comprising:

means for forming a working set list chain for a level of page table pages in a hierarchical page table structure, said working set list chain having one or more entries, said entries each indicating a working set list entry, each said indicated working set list entry describing a page of virtual memory mapping a page table page within said level of page table pages in said hierarchical page table structure, wherein said means for forming is performed while outswapping a number of body pages of said process; and means for locating and outswapping a number of page table pages of a process by traversing said working set list chain.

11. The memory of claim 10, wherein said means for outswapping said number of body pages of said process traverses a working set list of said process, said working set list including one or more working set list entries, one or more of said working set list entries each describing a page of virtual memory.

12. The memory of claim 11 wherein said means for traversing said working set list of said process determines whether each one of said working set list entries describes one of said page table pages within said level of page table pages in said hierarchical page table structure, and adds a link to said working set list chain if said one of said working set list entries describes one of said page table pages within said level of page table pages in said hierarchical page table structure.

13. The memory of claim 12 wherein said adding a link to said working set list chain includes writing an index of said one of said working set list entries into a field within a physical page database entry associated with a page of physical memory storing a previous one of said page table pages within said level of page table pages in said hierarchical page table structure.

14. The memory of claim 13 further comprising means for storing said working set list chain in page table entries at a higher level of the page table hierarchy than the level of page table pages described by the working set list chain.

15. The memory of claim 14 further comprising means for storing said page table entries at said higher level of said page table hierarchy and said working set list into a secondary storage device.

16. The memory of claim 15 further comprising:

means for reading said working set list and said page table entries at said higher level of said page table hierarchy back from said secondary storage device; and means for traversing said working set list chain in said page table entries at said higher level of said page table hierarchy to restore said level of page table pages in said hierarchical page table structure.

* * * * *